United States Patent
Kaido et al.

(10) Patent No.: US 6,314,638 B1
(45) Date of Patent: Nov. 13, 2001

(54) APPARATUS FOR MANUFACTURING ELECTRODE PLATE FOR NONAQUEOUS ELECTROLYTE BATTERY

(75) Inventors: Hideki Kaido; Kouichi Matsumoto; Minoru Hashimoto, all of Yokohama; Mitsuru Furuichi, Chigasaki, all of (JP)

(73) Assignee: Toshiba Battery Co., Ltd., Tokyo (JP)

( * ) Notice: Subject to any disclaimer, the term of this patent is extended or adjusted under 35 U.S.C. 154(b) by 0 days.

(21) Appl. No.: 09/247,619

(22) Filed: Feb. 10, 1999

Related U.S. Application Data

(62) Division of application No. 08/878,104, filed on Jun. 18, 1997.

(30) Foreign Application Priority Data

| Jun. 19, 1996 | (JP) | 8-157967 |
| Aug. 8, 1996 | (JP) | 8-210160 |
| Aug. 12, 1996 | (JP) | 8-212585 |
| Aug. 12, 1996 | (JP) | 8-212586 |

(51) Int. Cl.7 .......................... H01M 4/04; H01M 10/04; B05C 3/20; B05C 5/02
(52) U.S. Cl. .................. 29/730; 29/623.5; 141/32; 118/419; 118/410
(58) Field of Search .................. 29/623.1, 623.5, 29/730, 731; 118/59, 60, 300, 400, 419, 410; 141/32

(56) References Cited

U.S. PATENT DOCUMENTS

| 3,808,040 | 4/1974 | Barnes | 117/212 |
| 3,846,879 | 11/1974 | Jenkins | 29/2 |
| 3,951,688 | 4/1976 | Pankow et al. | 136/37 |
| 4,307,758 | 12/1981 | McDowall et al. | 141/1.1 |
| 4,318,430 | 3/1982 | Perman | 141/32 |
| 4,606,383 | 8/1986 | Yanik | 141/32 |
| 5,007,467 | 4/1991 | Nelles | 141/1.1 |
| 5,146,958 | 9/1992 | Bugnet et al. | 141/1.1 |
| 5,385,587 | 1/1995 | Lund et al. | 29/623.5 |
| 5,683,834 | 11/1997 | Fujimoto et al. | 429/218 |
| 5,697,145 | 12/1997 | Fukumura et al. | 29/623.5 |
| 5,721,073 | 2/1998 | Matamura et al. | 429/233 |
| 5,747,103 | 5/1998 | Mitchell, Jr. et al. | 427/123 |
| 5,824,156 | 10/1998 | Watanabe et al. | 118/410 |

FOREIGN PATENT DOCUMENTS

| 60-48865 | 10/1985 | (JP) . |
| 62-256365 | 11/1987 | (JP) . |
| 63-114058 | 5/1988 | (JP) . |
| 1-194265 | 8/1989 | (JP) . |
| 1-267953 | 10/1989 | (JP) . |
| 2-98040 | 4/1990 | (JP) . |
| 4-282558 | 10/1992 | (JP) . |
| 7-65816 | 3/1995 | (JP) . |
| 7-94170 | 4/1995 | (JP) . |

*Primary Examiner*—Gabrielle Brouillette
*Assistant Examiner*—Jonathan Crepeau
(74) *Attorney, Agent, or Firm*—Finnegan, Henderson, Farabow, Garrett & Dunner, L.L.P.

(57) ABSTRACT

An apparatus for manufacturing an electrode plate of a nonaqueous secondary battery comprises means for moving a sheet conductive base material in a first direction, a die nozzle for injecting an electrode material composition onto the sheet conductive base material, a pump disposed in supplying pipes, a valve disposed at the pipes between the pump and the die nozzle, a suction system disposed at the pipes between the valve and the die nozzle, and means for drying the electrode material composition. To form uncoated areas, either the die nozzle or sheet conductive base material may be configured to move in a direction substantially perpendicular to one another, or the die nozzle may be configured to move along the first direction. Additionally a coated amount of the electrode material composition per unit area along the first direction may be continuously increased or decreased.

4 Claims, 8 Drawing Sheets

[Prior Art]

FIG. 14A [Prior Art]
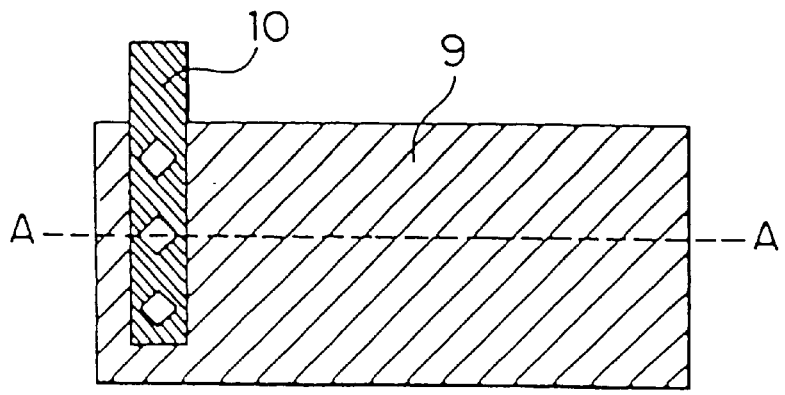
FIG. 14B [Prior Art]
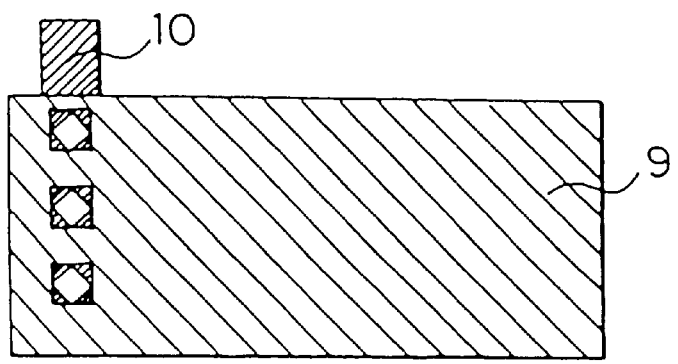
FIG. 14C [Prior Art]
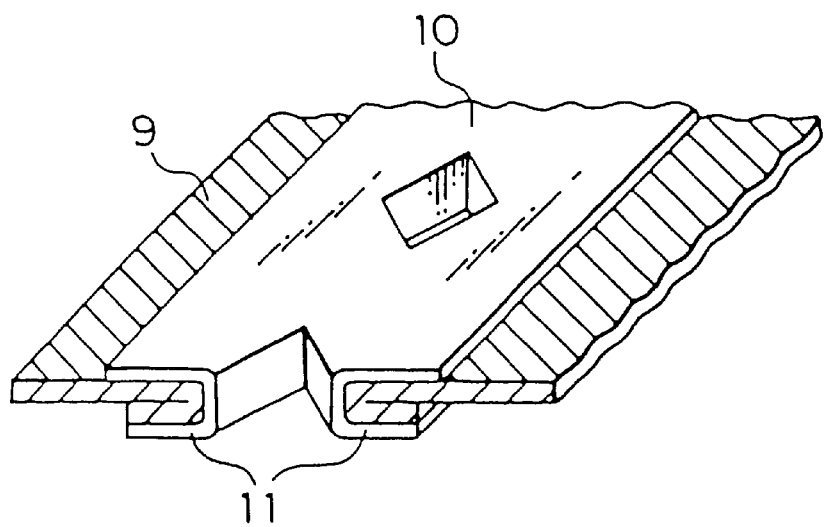

APPARATUS FOR MANUFACTURING ELECTRODE PLATE FOR NONAQUEOUS ELECTROLYTE BATTERY

This is a division of application Ser. No. 08/878,104, filed Jun. 18, 1997, which is incorporated herein by reference.

BACKGROUND OF THE INVENTION

1. Field of the Invention

The invention relates to a nonaqueous electrolyte battery, an electrode plate for the nonaqueous electrolyte battery, a method for manufacturing the electrode plate for the nonaqueous electrolyte battery, and an apparatus for manufacturing the electrode plate for the nonaqueous electrolyte battery.

2. Description of the Related Art

A nonaqueous electrolyte battery having lithium as an anode active material is attracting attention as a high-energy density battery, and particularly a primary battery having manganese dioxide, carbon fluoride or thionyl chloride as a cathode active material is extensively used as power supply for a calculator or a timepiece and as a backup battery for a memory.

Besides, with miniaturization and weight reduction of a camcorder, a laptop computer, a portable phone and other various electronic equipment in these years, demands for a secondary battery with a high-energy density as a power supply for such equipment are increasing, and a lithium secondary battery having a carbon material as anode active material is being studied vigorously.

Batteries having a nonaqueous electrolyte with a main component of an organic electrolytic solution (hereinafter referred to as the nonaqueous electrolyte battery) which are represented by a lithium battery need to have a thin electrode plate because electric conductivity of the nonaqueous electrolyte is lower than an aqueous electrolyte. And, since a large reaction area is needed to obtain a large current, the cathode and anode plates are made into a sheet, and these electrode plates are wound into a roll through the intermediary of a separator to form a spiral structure. The electrode plate for such a structure is a coated type electrode which is obtained by coating a conductive base material with a coating liquid which contains an active material and a conductive material which are called the mix.

FIG. 13 shows one example of such a battery structure.

The battery shown in FIG. 13 has a cathode plate 1 and an anode plate 2 laminated with a separator 3 which is an insulative film having a high ion transmittance therebetween, wound into a roll and housed in a container 4. And, a positive tab plate 5 is connected to a current collector at the inner periphery end of the cathode plate 1, and the positive tab plate 5 is further connected to a positive terminal 6 through a cap 6a. A negative tab plate 7 is connected to a current collector at the outer periphery end of the anode plate 2, and the negative tab plate 7 is also connected to a negative terminal 8 at the bottom of the container 4.

The cathode plate 1 and the anode plate 2 are produced by cutting to a desired length a sheet electrode plate which has both surfaces of a conductive base material coated with an electrode mix (electrode material coating agent) which mainly consists of a cathode or anode active material, a conductive agent and a binding agent. As shown in FIG. 14A to 14C, to connect the positive tab plate 5 and the negative tab plate 7 to the cathode plate 1 and the anode plate 2 respectively, it was conventional that a cross-shaped incision was formed in an electrode plate 9 (cathode plate or anode plate) and a tab plate 10 (cathode tab plate or anode tab plate), and the tab plate 10 was folded backward and crimped. But, a battery which had the tab plate 10 connected by this method had an unstable impedance. And, there were also disadvantages that the crimped part became thick and the tips of crimped part 11 ruptured the separator inducing a short circuit.

And, the tab plate is also connected to the electrode plate by welding, but the welded part on the electrode plate cannot be coated with an electrode mix to be the base of the conductive base material.

To expose the base of the conductive base material, it was conventional to remove the electrode mix layer which was formed by coating and drying an electrode material coating liquid. For example, Japanese Patent Publication No. Sho 60-48865 discloses a method of removing the electrode mix layer by forming lines with a pair of knife-edges and scraping the electrode mix layers between the lines by a screw slotting cutter. And, Japanese Patent Laid-Open Publication No. Hei 2-98040 proposes a method of removing the electrode mix by contacting blades from top and bottom to the base material, both surfaces of which are coated with the electrode mix layer. But, these methods needed the extra work of removing the electrode mix and wasted the removed electrode mix.

On the other hand, there is a method of coating the electrode mix with the base of the conductive base material left uncoated. Specifically, there is proposed a method of manufacturing a sheet electrode plate wherein a conductive agent is mixed with an electrode active material, a binding agent or the like is added thereto to prepare a paste electrode material (electrode mix) coating liquid, and this coating liquid is alternately applied and not applied to the surface of a conductive base material.

And, to produce the sheet electrode plate for electrodes as described above, there have been proposed a method of force charging a conductive mix which has a conductive agent and a binding agent kneaded with an electrode active material into a supporting material (conductive base material) while rolling, a method of extruding the kneaded electrode mix to form on both sides of a supporting material (Japanese Patent Laid-Open Publication No. Hei 4-282558), a pickup method (Japanese Patent Laid-Open Publication No. Sho 62-256365, Japanese Patent Laid-Open Publication No. Sho 63-114058), a pull-down method (Japanese Patent Laid-Open Publication No. Hei 1-267953, Japanese Patent Laid-Open Publication No. Hei 1-194265), a reverse-roll method, a gravure-roll method, a doctor blade method, and a method which uses an extrusion type injector having a slot nozzle (Japanese Patent Laid-Open Publication No. Hei 7-65816), to continuously coat the supporting material with the electrode mix.

For example, an electrode mix uncoated area may be formed in a direction that the conductive base material is moving by the roll coating such as a gravure roll method or a reverse roll method. For example, a reverse-roll method, which transcripts a coating liquid to the conductive base material by a backup roll, separates the backup roll from a coating roll to form an uncoated area in a longitudinal direction of coating. But, since the coating roll is revolving while the backup roll is separated from the coating roll, the coated thickness becomes excessively thick when the backup roll comes in contact again with the coating liquid on the coating roll. To prevent it from occurring, the coating roll may also be stopped at the same time when the backup roll is separated, but this method is not so effective although some improvement is achieved. Besides, the coating liquid on the roll is dried unevenly, causing bulges at the start and end of coating. Thus, the coated layer does not have a uniform thickness, having poor surface smoothness.

Besides, there is also proposed a manufacturing method that an electrode material coating liquid is injected by an extrusion type injector having a slot nozzle and coated onto the running conductive base material with uncoated areas formed parallel to the running direction (longitudinal direction), thereby producing a sheet electrode plate (Japanese Patent Laid-Open Publication No. Hei 7-94170). This method is a continuous coating method which can form a good coated layer while continuously disposing a longitudinal stripe-like uncoated area where the electrode mix is not formed.

This method, however, needs extra steps that the slot nozzle is exchanged to change the position and width of the uncoated area and a plate which is tightly fixed to the slot is moved to divide an opening.

And, there is proposed a method that the electrode material (electrode mix) coating liquid is excessively supplied to a conductive base material in advance, and the coating liquid is paused from being supplied by a shutter which is disposed just before a doctor blade, thereby forming uncoated areas at predetermined intervals in a running direction (longitudinal direction) of the conductive base material. But, even if the coating liquid is paused from being supplied by closing the shutter, the coating liquid left on the doctor blade adheres often to the uncoated areas. Therefore, this method has disadvantages that when a tab plate is connected to the uncoated area by welding, the adhered electrode mix deteriorates a welding strength of the tab plate, and the tab plate is easily separated.

Thus, the method which removes the coated and dried electrode mix layer to expose the base of the conductive base material in order to weld the tab plate needs an extra step and cannot produce the sheet electrode plate efficiently.

The method which forms the electrode mix uncoated areas by means of the shutter disposed immediately before the doctor blade has disadvantages that the electrode mix adhered to the uncoated areas degrades a weld strength of the tab plate and separates the welded tab plate. Besides, the method of forming the uncoated areas by the roller coating causes bulges at the start and end of coating, possibly cutting the conductive base material while pressing.

Specifically, the sheet electrode plate is compressed under high pressure by the roller press. But, when a pressure is raised, a space (gap) between the press rollers becomes substantially zero if no conductive base material is between them. Therefore, if the sheet having the electrode mix uncoated areas is pressurized and compressed under this situation, a very strong force is applied when the uncoated area is passed between the rollers after the coated area, and the conductive base material is partly stretched or cut. And, if the conductive base material is cut off, the opposed rollers are directly contacted mutually, resulting in damaging the roller surfaces.

Thus, batteries using the sheet electrode plates produced by the above methods tend to suffer from deterioration in performance of charging and discharging cycle over a long period.

Specifically, these methods had disadvantages of needing additional processes of changing nozzles and peeling because the supporting material is continuously coated with a predetermined amount of electrode mix. The sheet electrode plates produced by the above methods are cut to a length suitable for a single cylindrical or square battery and wound into a roll, and when it is particularly used for a cylindrical battery, inflow and outflow of the electrolytic solution owing to the charging and discharging are different between the core and the outer periphery due to a difference in radius of curvature, and performance is easily degraded by a charging and discharging cycle over a long period.

SUMMARY OF THE INVENTION

The invention has been achieved to remedy the disadvantage in pressing for alternate coating and uncoating, and aims to provide a method of producing a good electrode mix layer having a predetermined length while an uncoated area which is used to weld a tab plate on it is efficiently formed on a conductive base material to produce a sheet electrode plate to be used as the electrode for a nonaqueous electrolyte battery, an electrode plate for such a nonaqueous electrolyte battery, a nonaqueous electrolyte battery provided with the electrode plate for such a nonaqueous electrolyte battery, and an apparatus for manufacturing the electrode plate for such a nonaqueous electrolyte battery.

In addition, the invention has been achieved to remedy the disadvantages involved in pressing, and also aims to provide a method for producing an electrode plate for a nonaqueous electrolyte battery wherein a coated sheet on which an uncoated area is formed for connecting a tab plate is compressed by a roller press without stretching or cutting a conductive base material in an electrode mix coating step, and an apparatus for manufacturing the electrode plate for a nonaqueous electrolyte battery.

The invention has been achieved to remedy the disadvantage of degrading the charging and discharging cycle performance, and also aims to provide a method for manufacturing an electrode plate for a nonaqueous electrolyte battery which can be used as a battery having remarkable safety, high capacity, a small change in discharge capacity in a production process, and improved charging and discharging cycle, an electrode plate for such a nonaqueous electrolyte battery, and a nonaqueous electrolyte battery provided with an electrode made of the electrode plate for such a nonaqueous electrolyte battery.

The method for manufacturing an electrode plate of a nonaqueous electrolyte battery of claim 1 according to the invention comprises the steps of:

running a sheet conductive base material in a first direction; and injecting an electrode material composition from a die nozzle onto a first surface of the running sheet conductive base material to form uncoated areas at predetermined intervals on the first surface along the first direction.

The method for manufacturing an electrode plate of a nonaqueous electrolyte battery of claim 10 comprises the steps of:

running a sheet conductive base material in a first direction; and injecting an electrode material composition from a die nozzle onto a first and/or second surface of the running sheet conductive base material to continuously decrease or increase at a predetermined ratio the coated amount per unit area along the first running direction of the sheet conductive base material.

The method for manufacturing an electrode plate of a nonaqueous electrolyte battery of claim 12 comprises the steps of:

running a sheet conductive base material in a first direction; and injecting an electrode material composition from a die nozzle onto first and second surfaces of the running sheet conductive base material to apply the electrode material composition per unit area in a different amount between the first area and the second area.

The electrode plate of a nonaqueous electrolyte battery of claim 14 comprises a rectangular sheet conductive base material having a first side, a second side which is shorter than the first side, a first surface, and a second surface; and an electrode material composition layer consisting of a first electrode material composition layer which is formed on the first surface of the sheet conductive base material and a second electrode material composition layer which is formed on the second surface with an uncoated area extending in a direction of the second side formed intermittently with respect to a direction of the first side at a position where the first electrode material composition layer and the second electrode material composition layer are mutually opposed.

The electrode plate of a nonaqueous electrolyte battery of claim 17 comprises a rectangular sheet conductive base material having a first side, a second side which is shorter than the first side, a first surface, and a second surface; and an electrode material composition layer which is formed on one of the first and second surfaces of the sheet conductive base material to continuously increase or decrease in the coated amount from one end to the other end along the first side of the sheet conductive base material.

The electrode plate of a nonaqueous electrolyte battery of claim 19 comprises a rectangular sheet conductive base material having a first side, a second side which is shorter than the first side, a first surface, and a second surface; and an electrode material composition layer which is formed on one of the first and second surfaces of the sheet conductive base material to have an active material density in the electrode material composition layer continuously increased or decreased from one end to the other end along the first side of the sheet conductive base material.

The electrode plate of a nonaqueous electrolyte battery of claim 20 comprises a rectangular sheet conductive base material having a first surface and a second surface; a first electrode material composition layer formed on the first surface of the sheet conductive base material; and a second electrode material coated layer which is formed on the second surface of the sheet conductive base material and different in the coated amount of the electrode material composition from the first electrode material composition layer.

The apparatus for manufacturing an electrode plate of a nonaqueous electrolyte battery of claim 22 is an apparatus for manufacturing an electrode plate of a nonaqueous electrolyte battery by applying an electrode material composition onto a first surface and/or a second surface of a rectangular sheet conductive base material having a first side, a second side longer than the first side, a first surface, and a second surface, the apparatus comprises means for moving the sheet conducive base material in a direction parallel to the first side; an injecting means which is disposed in the neighborhood of the surface of the moving sheet conductive base material and injects the electrode material composition in a direction substantially perpendicular to the first side; a coating agent supplying means for intermittently supplying the electrode material composition to the injecting means; a drying means for drying the electrode material composition coated onto the surface of the sheet conductive base material; and a pressurizing and compressing means for pressuring and compressing the dried sheet conductive base material and the electrode material composition.

The nonaqueous electrolyte battery of claim 25 comprises a spiral cathode plate which is formed by winding a rectangular sheet conductive base material having a first side, a second side shorter than the first side, a first surface and a second surface around a shaft parallel to the second side; a spiral anode plate which is formed by winding a rectangular sheet conductive base material having a first side, a second side shorter than the first side, a first surface and a second surface around a shaft parallel to the second side and which is disposed to be substantially parallel to the surface of the cathode plate; an electrode material composition layer which is formed on the first and second surfaces of the cathode and anode plates and has an uncoated area, which is formed in multiple numbers on at least one of the first and second surfaces along the first side to extend in a direction of the second side, disposed intermittently with respect to the first side; a separator which is held between the cathode plate and the anode plate; and an outer member which has a positive terminal electrically connected to the uncoated area of the cathode plate and a negative terminal electrically connected to the anode plate.

The nonaqueous electrolyte battery of claim 28 comprises a spiral cathode plate which is formed by winding a rectangular sheet conductive base material having a first side, a second side shorter than the first side, a first surface and a second surface around a shaft parallel to the second side; a spiral anode plate which is formed by winding a rectangular sheet conductive base material having a first side, a second side shorter than the first side, a first surface and a second surface around a shaft parallel to the second side and which is disposed to be substantially parallel to the surface of the cathode plate; an electrode material composition layer which is formed on at least one of the first and second surfaces of the cathode plate and/or the anode plate to have the coated amount continuously increased or decreased from one end to the other end along the first side of the cathode plate and/or the anode plate; a separator which is held between the cathode plate and the anode plate; and an outer member which has a positive terminal electrically connected to the cathode plate and a negative terminal electrically connected to the anode plate.

The nonaqueous electrolyte battery of claim 29 comprises a spiral cathode plate which is formed by winding a rectangular sheet conductive base material having a first side, a second side shorter than the first side, a first surface and a second surface around a shaft parallel to the second side; an anode plate which has a spiral shape formed by winding a rectangular sheet conductive base material having a first side and a second side shorter than the first side around a shaft parallel to the second side and which is disposed to be substantially parallel to the surface of the cathode plate and has its distance from the cathode plate continuously decreased or increased from the center to the outer periphery of the battery; an electrode material composition layer which is formed on the first and second surfaces of the cathode and anode plates; a separator which is held between the cathode plate and the anode plate; and an outer member which has a positive terminal electrically connected to the cathode plate and a negative terminal electrically connected to the anode plate.

The nonaqueous electrolyte battery of claim 31 comprises a spiral cathode plate which is formed by winding a rectangular sheet conductive base material having a first side, a second side shorter than the first side, a first surface and a second surface around a shaft parallel to the second side; a spiral anode plate which is formed by winding a rectangular sheet conductive base material having a first side, a second side shorter than the first side, a first surface and a second surface around a shaft parallel to the second side and which is disposed to be substantially parallel to the surface of the cathode plate; an electrode material composition layer which is formed on at least one of the first and second surfaces of the cathode plate and/or the anode plate to have an active material density of the electrode material composition layer continuously increased or decreased from one end to the other end along the first side of the cathode plate and/or the anode plate; a separator which is held between the cathode plate and the anode plate; and an outer member which has a positive terminal electrically connected to the cathode plate and a negative terminal electrically connected to the anode plate.

The nonaqueous electrolyte battery of claim 33 comprises a spiral cathode plate which is formed by winding a rectangular sheet conductive base material having a first side, a second side shorter than the first side, a first surface and a second surface around a shaft parallel to the second side; a spiral anode plate which is formed by winding a rectangular sheet conductive base material having a first side, a second side shorter than the first side, a first surface and a second surface around a shaft parallel to the second side and which is disposed to be substantially parallel to the surface of the cathode plate; a first electrode material composition layer which is formed on the first surfaces of the cathode and anode plates; a second electrode material coated layer which is formed on the second surfaces of the cathode and anode plates and has the coated amount of the electrode material composition different from the first electrode material composition layer of the cathode plate or the anode plate; a separator which is held between the cathode plate and the anode plate; and an outer member which has a positive terminal electrically connected to the cathode plate and a negative terminal electrically connected to the anode plate.

The invention of the method for manufacturing an electrode plate of a nonaqueous electrolyte battery of claim 1 runs the sheet conductive base material in the first direction and injects the electrode material composition from the die nozzle onto the first surface of the sheet conductive base material to form the uncoated areas at predetermined intervals on the first surface along the first direction.

Therefore, the uncoated areas are formed at the predetermined intervals on the sheet electrode base material in the first direction. The uncoated area is formed to weld the tab thereto to take electric power from the electrodes. The uncoated area is quite free from the electrode material composition and exposes the metal surface, so that the tab can be welded efficiently in a short time.

The method for manufacturing of claim 10 injects the electrode material composition onto the surface of the running sheet conductive base material to continuously decrease or increase at the predetermined ratio the coated amount per unit area along the first running direction of the sheet conductive base material.

Therefore, in manufacturing the battery, when the sheet conductive base material on which the electrode material composition is coated is wound around the shaft which is parallel to the second side of the sheet conductive base material, the distance between the two opposed electrodes, namely between the cathode and the anode, is different at the center and the outer periphery of the finished battery and varies continuously from the center to the outer periphery of the battery. As a result, even if a radius of curvature is different between the center and the outer periphery of the battery, the distribution of the electrode material composition held between the cathode and the anode can be adjusted at the center and the outer periphery of the battery because the distance between the cathode and the anode is appropriately disposed, so that the charging and discharging characteristic can be made uniform at the center and the outer periphery of the battery. Thus, the charging and discharging characteristic of the battery can be prevented from being degraded.

The method for manufacturing of claim 12 injects the electrode material composition from the die nozzle onto the first and second surfaces of the running sheet conductive base material in a different amount of the electrode material composition per unit area between the first surface and the second surface.

In manufacturing the battery, when the sheet conductive base material on which the electrode material composition is coated is wound around the shaft which is parallel to the second side of the sheet conductive base material, the amount of the electrode material composition held between the first surface and the second surface of the sheet conductive base material may be different due to a difference of the radius of curvature. But, since the coated amount of the electrode material composition is different on the first surface and the second surface of the sheet conductive base material, and this difference offsets the difference of the held amount of the electrode material composition based on the difference of the radius of curvature. As a result, the charging and discharging characteristic can be made uniform at the center and the outer periphery of the battery. And, the charging and discharging characteristic of the battery can be prevented from being degraded.

The electrode plate of a nonaqueous electrolyte battery of claim 13 forms an uncoated area extending in a direction of the second side intermittently with respect to a direction of the first side at a position where the first electrode material composition layer and the second electrode material composition layer are mutually opposed with respect to the first and second electrode material composition layers formed on the sheet conductive base material.

This uncoated area is formed to weld the tab thereto to take electric power from the electrodes. The uncoated area is quite free from the electrode material composition and exposes the metal surface, so that the tab can be welded efficiently in a short time.

The electrode plate of a nonaqueous electrolyte battery of claim 17 has the electrode material composition layer formed on the surface of the sheet conductive base material to continuously increase or decrease the coated amount from one end to the other end along the first side of the sheet conductive base material.

Therefore, in manufacturing the battery, when the sheet conductive base material on which the electrode material composition is coated is wound around the shaft which is parallel to the second side of the sheet conductive base material, the space between the two opposed electrodes, namely between the cathode and the anode, is different at the center and the outer periphery of the finished battery and varies continuously from the center to the outer periphery of the battery. As a result, even if a radius of curvature is different between the center and the outer periphery of the battery, the distribution of the electrode material composition held between the cathode and the anode can be adjusted at the center and the outer periphery of the battery because the distance between the cathode and the anode is appropriately disposed, so that the charging and discharging characteristic can be made uniform at the center and the outer periphery of the battery. Thus, the charging and discharging characteristic of the battery can be prevented from being degraded.

The electrode plate of a nonaqueous electrolyte battery of claim 19 has the electrode material composition layer formed on the sheet conductive base material to continuously increase or decrease the active material density in the electrode material composition layer from one end to the other end along the first side of the sheet conductive base material.

In manufacturing the battery, when the sheet conductive base material on which the electrode material composition is coated is wound around the shaft which is parallel to the second side of the sheet conductive base material, the amount of the electrode material composition held between the two opposed electrodes, namely between the cathode and the anode, may be different at the center and the outer periphery of the battery due to a difference of the radius of curvature.

But, the invention has the active material density in the electrode material composition continuously varied, and the difference of the active material density is offset by the difference of the held amount of the electrode material composition based on the difference of the radius of curvature. As a result, the charging and discharging characteristic is kept uniform at the center and the outer periphery of the battery, and the charging and discharging characteristic of the battery can be prevented from being degraded.

The apparatus for manufacturing an electrode plate of a nonaqueous electrolyte battery of claim 22 has the means for moving the sheet conductive base material in the direction of the first side and the injecting means for injecting the electrode material composition in a direction substantially perpendicular to the first side.

Therefore, the uncoated areas are formed at the predetermined intervals along the first direction on the surface of the sheet conductive base material. The uncoated area is formed to weld the tab thereto to take electric power from the electrodes. The uncoated area is quite free from the electrode material composition and exposes the metal surface, so that the tab can be welded efficiently in a short time.

The nonaqueous electrolyte battery of claim 25 has the electrode material composition layer formed on the cathode plate and the anode plate, and the uncoated area which is formed in multiple numbers along the first side to extend in the direction of the second side formed intermittently with respect to the direction of the first side of the electrode material composition layer.

This uncoated area is formed to weld the tab thereto to take electric power from the electrodes. The uncoated area is quite free from the electrode material composition and exposes the metal surface, so that the tab can be welded efficiently in a short time.

The nonaqueous electrolyte battery of claim 28 has the electrode material composition layer formed on the electrode plate to continuously increase or decrease the coated amount from one end to the other end along the first side of the cathode plate and/or the anode plate.

Therefore, in manufacturing the battery, when the sheet conductive base material on which the electrode material composition is coated is wound around the shaft which is parallel to the second side of the sheet conductive base material, the distance between the two opposed electrodes, namely between the cathode and the anode, is different at the center and the outer periphery of the finished battery and varies continuously from the center to the outer periphery of the battery. As a result, even if a radius of curvature is different between the center and the outer periphery of the battery, the distribution of the electrode material composition held between the cathode and the anode can be adjusted at the center and the outer periphery of the battery because the distance between the cathode and the anode is appropriately disposed, so that the charging and discharging characteristic can be made uniform at the center and the outer periphery of the battery. Thus, the charging and discharging characteristic of the battery can be prevented from being degraded.

The nonaqueous electrolyte battery of claim 29 has the spiral cathode plate and the spiral anode plate disposed to mutually oppose, and the gap between these cathode and anode plates designed to continuously decrease or increase from the center to the outer periphery of the battery.

Therefore, even if the amount of the electrode material composition held between the electrodes is different between the center and the outer periphery of the battery due to the difference of a radius of curvature between the center and the outer periphery of the battery, the gap between the cathode and the anode is variable appropriately in this invention, and this variable degree is offset by the held amount of the electrode material composition based on the difference of the radius of curvature. As a result, the charging and discharging characteristic can be made uniform at the center and the outer periphery of the battery. Thus, the charging and discharging characteristic of the battery can be prevented from being degraded.

The nonaqueous electrolyte battery of claim 31 has the electrode material composition layer formed on the sheet conductive base material to have the active material density continuously increased or decreased from one end to the other end along the first side of the cathode plate or the anode plate.

Therefore, even if the held amount of the electrode material composition is different between the center and the outer periphery of the battery due to the difference of a radius of curvature, since the active material density is continuously changed in advance, the difference of the active material density is offset by the difference of the held amount of the electrode material composition. As a result, the charging and discharging characteristic can be made uniform at the center and the outer periphery of the battery. Thus, the charging and discharging characteristic of the battery can be prevented from being degraded.

The nonaqueous electrolyte battery of claim 33 has a different amount of the electrode material composition coated on the first surface and the second surface of the sheet conductive base material.

Therefore, even if the first electrode material composition layer on the first surface of the sheet conductive base material and the second electrode material composition layer on the second surface have a different length in the first direction due to the difference of a radius of curvature at the center and the outer periphery of the battery, the difference of length in the first direction is offset by the difference of the amount of the electrode material composition coated onto the first surface and the second surface. As a result, the charging and discharging characteristic can be made uniform at the center and the outer periphery of the battery, and the charging and discharging characteristic of the battery can be prevented from being degraded.

BRIEF DESCRIPTION OF THE DRAWINGS

FIG. 14A is a diagram showing the front surface of an electrode plate to which a tab plate was connected by a conventional method, FIG. 14B is a diagram showing the rear surface of the same part, and FIG. 14C is a perspective sectional view taken on line A—A of FIG. 14A.

DESCRIPTION OF PREFERRED EMBODIMENTS

Figure 1:
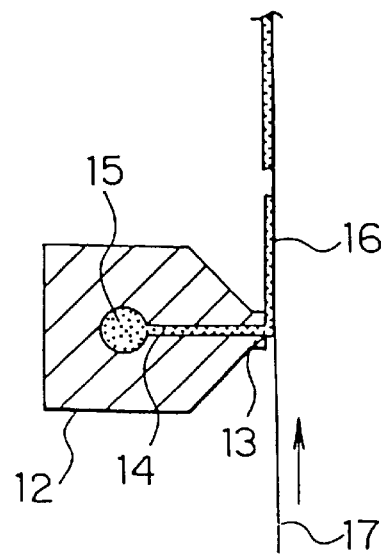
FIG. 1 is a sectional view schematically showing one embodiment of the die nozzle used according to a first aspect of the invention.

FIG. 1 shows one embodiment of a die nozzle used in the invention.

It is seen that a die nozzle 12 has two lips 13 mutually opposed with an appropriate space therebetween to form a land 14 and a manifold 15 for accumulating a liquid which is communicated with the land 14. An electrode material (electrode mix) composition 16 is supplied in a predetermined amount to the manifold 15 by an externally disposed coating liquid supply system (not shown), and injected from the land outlet formed at the leading end of the lips 13 through the land 14. The die nozzle 12 is disposed to have a predetermined distance from a conductive base material 17 where the tips of the lips 13 travel, and the electrode material composition 16 which is injected from the tips of the lips 13 is uniformly coated to the conductive base material 17. The material forming the die nozzle 12 is selected from materials excelling in corrosion resistance when the composition is corrosive but generally selected from a metal, an alloy, ceramics or plastics. And, a preferable space between the two lips 13, namely a preferable width of the outlet of the land 14, is 50–1200 $\mu$m, more preferably 100–800 $\mu$m, though variable depending on a viscosity (apparent viscosity) of the electrode material composition.

Figure 2:
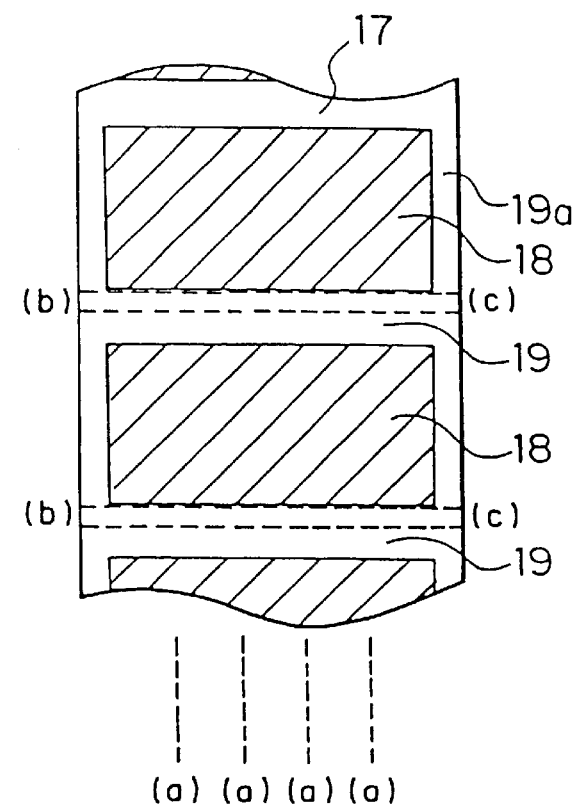
FIG. 2 is a plane view showing a coated pattern of an electrode mix coating liquid formed on a conductive base material according to the first aspect of the invention.

In applying the electrode material composition 16 by the die nozzle 12 according to the invention, the die nozzle 12 or the conductive base material 17 is traveled in a direction substantially perpendicular to the coated surface of the conductive base material 17 or to the end faces of the lips 13 of the die nozzle 12 to separate mutually; the die nozzle 12 is swung in a direction parallel to the travelling direction of the conductive base material 17; or the coating liquid is intermittently supplied to the die nozzle 12 by the composition supply system. Thus, as indicated by the coated patterns in FIG. 2, an uncoated portion 19 can be formed between electrode mix coated portions 18 at predetermined intervals in the longitudinal direction (coating direction) of the conductive base material 17.

The uncoated portion 19 may be formed in the same position or slightly deviated position on both surfaces of the conductive base material 17. And, an uncoated lug 19a is also formed on both ends in the breadth direction of the conductive base material 17 but not used for the electrode plate because the uncoated lug 19a is formed to prevent the composition from extending from the ends of the conductive base material 17, and adhering to a backup roll and being cut off.

In the coated pattern described above, a length of the coated portion 18 and a length of the uncoated portion 19 can be varied as desired to conform with a size of the electrode to be cut off from the base material 17. And, the coated sheet having the coated patterns is cut in a direction (cutting lines are indicated by a broken line (a)) parallel to the longitudinal direction to conform with the size (height) of a battery and cut in the breadth direction to obtain a single electrode. At this time, the uncoated portion 19 may be cut off at its middle as indicated by a broken line (b), or may be cut at its boundary with the coated portion 18 as indicated by a broken line (c). Besides, a coated film having the coated pattern as described above has preferably a thickness of 5–1800 $\mu$m (particularly, 50–500 $\mu$m) after drying.

The uncoated portion is preferably formed on both ends of the sheet conductive base material for a single nonaqueous electrolyte battery, namely on both ends in the longitudinal direction of the sheet conductive base material when the sheet conductive base material is cut to a length of the single nonaqueous electrolyte battery. When the uncoated portion is not formed and if a short circuit takes place between a cathode and an anode because of some trouble, e.g., when an electrode plate is deformed by a strong force which is applied from the outer periphery of the nonaqueous electrolyte battery to the internal core or when the electrode is pierced by a sharp material such as a nail, a large current flows between the cathode and the anode to cause a runaway reaction to make the battery a high temperature, possibly resulting in exploding. But, when the uncoated portion is formed on the both ends for the cathode and the anode, the runaway reaction does not occur because the cathode and the anode are directly contacted via the uncoated portion even if an external force is applied to cause deformation. Thus, the battery's temperature is slightly raised, but a possibility of explosion can be prevented.

The electrode material composition to be coated in the invention can contain an electrode active material having a particle diameter of 0.01–100 $\mu$m, a conductive agent, a binder, a solvent and the like. The electrode active material can be any compound into or from which $H^+$, $Li^+$, $Na^+$, or $K^+$ can be inserted or discharged. Among others, a transition metallic oxide, transition metallic chalcogenide, carbonaceous material or the like can be used, and particularly, a lithium-containing transition metallic oxide or carbonaceous material is used preferably. It is preferable that the transition metal is mainly formed of Co, Mn, Ni, V or Fe, namely $LiCoO_2$, $LiNiO_2$, $LiMn_2O_4$, $LiCoVO_4$, $LiNiVO_4$, $LiCo_{0.9}Sn_{0.1}O_2$, $Fe_3O_4$, or $V_2O_5$. And, the carbon material is desired to have a 002 plane spacing of 0.335–0.38 nm, and a density of 1.1–2.3 g/cm$^3$, specifically graphite, petroleum coke, cresol resin calcined carbon, furan resin calcined carbon, polyacrylonitrile fiber calcined carbon, gas-phase grown carbon, or mesophase pitch calcined carbon.

The conductive agent can be any electronic conductive material which does not cause any chemical change in the formed battery. Generally, conductive materials such as natural graphite (flake graphite, scaly graphite, etc.), manufactured graphite carbon black, acetylene black, Ketjen black, carbon fiber, metal powder, or metal fiber can be used solely or as a mix of at least two of them, and it is particularly preferable to use graphite and acetylene black together.

The binder can be one member or a mix of at least two member of polysaccharide, thermoplastic resin or polymer having rubber elasticity which is hardly dissolved or swelled in an organic electrolytic solution to be used for the non-aqueous electrolyte battery. Specifically, starch, carboxymethylcellulose, hydroxypropyl cellulose, polyvinyl alcohol, polyvinyl chloride, polytetrafluoroethylene, polyvinylidene fluoride, fluororubber, ethylene-propylene-diene terpolymer (EPDM), styrene-butadiene rubber, polybutadiene, polyethylene oxide or the like can be used for the binder. These binders may be dissolved into a solvent or may be dispersed or suspended in a state of emulsion.

Besides, the solvent for kneading the electrode active material, conductive agent and binder can be water or an organic solvent or a mix of at least two organic solvents. The organic solvent is not limited to a particular one, but it is preferable to use N-methylpyrolydone, xylene, toluene, acetone, methyl ethyl ketone, methylisobutyl ketone, cyclohexanone, ethanol, methanol, ethyl acetate, butyl acetate, methylene chloride, ethylene chloride, ethylcellosolve or the like.

In this invention, the electrode material composition is not limited to a particular composition, and generally consists of 1–50 parts by weight, preferably 1–10 parts by weight of a conductive agent and 0.1–50 parts by weight, preferably 0.1–20 parts by weight of a binder to 100 parts by weight of the electrode active material; it is preferable to add a solvent to adjust a solid content ratio to 10–80% by weight. The solvent is contained in an amount of 30–600 parts by weight. And, the electrode material composition is a liquid having an apparent viscosity of 500–100000 mPa·S, more preferably 1000–50000 mPa·S, at a shear rate of 13 sec$^{-1}$. When the composition has an apparent viscosity of less than 500 mPa·S, it drips easily from the lip end of the die nozzle when the supply of the composition is stopped, or the coated composition has its portion facing the uncoated area deformed to flow to reach the uncoated area, and a contact angle to the surface of the base material falls very short of 90 degrees.

When the apparent viscosity exceeds 100000 mPa·S, the die nozzle has an excessively high injection pressure, the land tends to have an instable bore (lip clearance), and a uniform coated thickness cannot be obtained accurately.

On the other hand, when the apparent viscosity is 500–100000 mPa·S, the electrode material composition does not have any problem of deformation or leak and its contact angle can be kept at about 90 degrees. And, a uniform coated thickness can be obtained accurately.

Furthermore, the composition can be controlled to an appropriate temperature as required, and preferably to a range of 10–60° C. (particularly 15–45° C.), and more preferably to a range of 15–30° C. (particularly 20–25° C.), when the composition is coated. Tolerance is more preferably in an adjusting range of ±2° C. And, it is desired that the composition and the die nozzle are adjusted to have the same temperature when the composition is coated.

The conductive base material used in this invention is not particularly limited, and may use a metallic foil of aluminum, copper, nickel or stainless steel, or a conductive film of inorganic oxide, organic macromolecular material or carbon. And, the conductive base material can be formed into various forms such as a continuous sheet, perforated sheet, or net sheet, and the continuous sheet is particularly preferable. Besides, the conductive base material has preferably a thickness of 1–30 μm, and more preferably 5–30 μm.

In this invention, the electrode material composition is coated to front and back faces of the conductive base material sequentially or simultaneously, the conductive base material is transferred into a dry chamber to remove the solvent from the coated film, and it is pressed by a method of passing it through press rolls or the like. The drying method can be hot-air drying, infrared drying, contact drum drying or a combination thereof. To dry by the hot-air drying, a drying temperature is determined according to the composition, preferably set to 50–180° C. (particularly, 50–160° C.), and more preferably to 90–150° C. (particularly, 90–130° C.).

The coated sheet thus dried is then compressed by being passed through a pair of opposed rolls (press rolls) of a roller press, but the present invention can also pressurize the coated sheet in a state that an appropriate gap is disposed between the main faces of the rollers. At this time, assuming that the conductive base material has a thickness d and the compressed electrode plate has a target thickness $D_0$, the gap size D is desired to satisfy $d \times 0.6 \leq D \leq D_0$. When the gap size D is less than 0.6 time of the thickness of the conductive base material, a very strong force is applied to the coated sheet having the uncoated areas while it is passing through the rollers, partly expanding or cutting the conductive base material. And, if the gap size D is larger than the target thickness Do, satisfactory pressurizing and compressing effects cannot be obtained.

The press rollers are made of a metal or rigid plastics which preferably have hardness of 80 or higher measured by a Shore D durometer. Metal press rollers may be used in pair, rigid plastics press rollers may be used in pair, or a metal press roller may be used in combination with a rigid plastics press roller. These rollers are determined to have an appropriate diameter depending on the material and thickness of the conductive base material. The rollers may be disposed at a single stage but a plurality of pairs of rollers may be disposed at multiple stages. And, the multi-stage rollers generally have a roll nip disposed in series. But, the multiple pairs of rollers may be disposed in a row, and the coated sheet may be passed in a staggered pattern through these rollers. Besides, the multi-stage rollers may have the same diameter or a different diameter.

A pressure for compressing is preferably 100–700 kg/cm in linear pressure, and more preferably 200–550 kg/cm. And, the rollers are not limited to a particular temperature, but heated to temperatures ranging from room temperature to 200° C.

In applying the electrode material composition by means of the die nozzle according to the invention, the uncoated area is formed by either of the following two coating liquid supply systems. Specifically, one of the coating liquid supply systems is a gas force feeding system in which an inert gas such as air, nitrogen or argon is charged under pressure into an enclosed tank which contains the electrode material composition to supply the composition to the manifold of the die nozzle. And, in this supply system, by opening or closing a solenoid valve (injection valve) which is disposed on a supply passage, the composition is supplied to the die nozzle intermittently to form the uncoated areas at predetermined intervals in the longitudinal direction of the conductive base material.

The other coating liquid supply system in the invention is a direct supply system which supplies the composition kept in an ordinary storage tank to the die nozzle by a supply pump. And, this supply system can supply the composition to the die nozzle by intermittently switching the opening or closing direction of a cross valve which is disposed on a supply passage. The composition which passes through the cross valve is supplied to the die nozzle or returned to the storage tank according to the opened or closed direction in this supply system, but the composition is continuously discharged from the tank without being stopped.

These two supply systems intermittently supply the composition to the die nozzle and move the die nozzle as described below to form the uncoated areas, so that the bulges can be prevented from being formed at the start and end of coating. Specifically, the die nozzle is traveled in a direction substantially perpendicular to the coating surface of the conductive base material or the die nozzle is swung about an appropriate point in a direction parallel to a direction that the conductive base material is traveled to separate the lip end of the die nozzle from the coating surface of the conductive base material.

In addition, the uncoated areas can also be formed by sucking a predetermined amount from the composition in the land and manifold by a vacuum pump or the like for a predetermined duration to remove with force.

And, this intermittent coating system can continuously vary (decrease or increase) the coated amount per unit area on each coated area in the longitudinal direction. For example, in the former gas force feeding system of the coating liquid supply system, the pressure of the inert gas to be supplied into the enclosed tank is continuously varied (decreased or increased), so that the amount of the composition supplied to the die nozzle can be varied continuously. And, in the latter direct supply system of the coating liquid supply system, a servo motor or the like is disposed for the supply pump which delivers the composition to continuously vary (decrease or increase) the motor speed, so that the amount of the composition supplied to the die nozzle can be varied continuously. Thus, by decreasing or increasing the amount of the composition supplied to the die nozzle, the coated layer formed on the conductive base material becomes thin or thick, and the coating amount per unit area can be decreased or increased continuously.

According to the invention, after applying the composition with the coating amount continuously varied in the longitudinal direction of the conductive base material, the coated layer is pressurized and compressed to form an electrode mix layer which has a uniform thickness in the longitudinal direction and a density of the electrode active material contained in the layer varied (decreased or increased) continuously.

It is preferred that a difference of the coated amount per unit area at both ends in the longitudinal direction of the coated area and a difference of the active material density in the electrode mix layer after pressuring process are each preferably 2–20% with respect to the coated amount at the end with a small amount and the active material density on the low density side. When the difference of the coated amount at both ends and the difference of the active material density are less than 2%, the continuous change of the coated amount and the active material density is substantially not effective, and when it exceeds 20%, impregnation of a portion, where the coated amount per unit area is large and the active material density after the pressuring process is high, with the electrolytic solution is poor, the battery capacity is lowered and heavily deviated, and the cycle life is made short.

In the continuous change of the coated amount, it is necessary to apply intermittently as described above to form the uncoated areas at predetermined intervals in the longitudinal direction of the conductive base material in view of work efficiency. Specifically, to decrease or increase the coated amount per unit area continuously in the longitudinal direction at a single electrode coated area, it is advantageous in view of work efficiency that the uncoated areas are disposed at predetermined intervals in the longitudinal direction of the conductive base material and the coated amount or the coated thickness is continuously varied in the longitudinal direction.

And, the invention can keep the electrode mix (electrode active material) in an optimum balance for the cathode and the anode for the nonaqueous electrolyte battery which is formed by winding a sheet electrode into a cylinder by varying the coated amount of the electrode mix per unit area on the front and back surfaces of the conductive base material to change the active material density in the electrode mix layer on the both surfaces of the electrode plate after the pressuring process. At this time, the difference of the coated amount of the electrode mix between the front and back surfaces of the conductive base material is preferably at a ratio of 2–10% with respect to the smaller coated amount. If the difference between the coated amounts is less than 2%, there is substantially no effect of changing the coated amount on both surfaces, and if it exceeds 10%, the amount of the electrode mix (electrode active material) is not well-balanced between the cathode and the anode, some portions are poorly impregnated with the electrolytic solution to lower the battery capacity, and the cycle life is shortened. For example, when $LiCoO_2$ is used as the cathode active material for a lithium secondary battery and the amount of the electrode active material for the cathode is larger than for the anode, all the Li ions generated from the cathode are not fully intercalated by the anode. As a result, Li metal is deposited on the surface of the anode, causing a problem in view of safety and also deteriorating the cycling property.

The cathode and the anode produced from the sheet electrode plate which is produced by the method according to the invention can be used to produce a secondary battery in the shape of a cylinder or square. A separator for separating the cathode sheet and the anode sheet can be a polyethylene film, a micro-cellular polypropylene film or a glass fiber film. And, the electrolyte is a solution consisting of as the organic solvent a solvent which is prepared by mixing at least one of aprotic organic solvents such as propylene carbonate, ethylene carbonate, butylene carbonate, dimethyl carbonate, diethyl carbonate, γ-butyrolactone, 1,2-dimethoxyethane and tetrahydroxyfuran and lithium salt soluble into the solvent, such as at least one salt, e.g., $LiClO_4$, $LiBF_4$, $LiPF_6$, $LiCF_3SO_3$, $LiCF_3CO_2$ or $LiAsF_6$.

The invention will be described with reference to the accompanying drawings.

Figure 3:
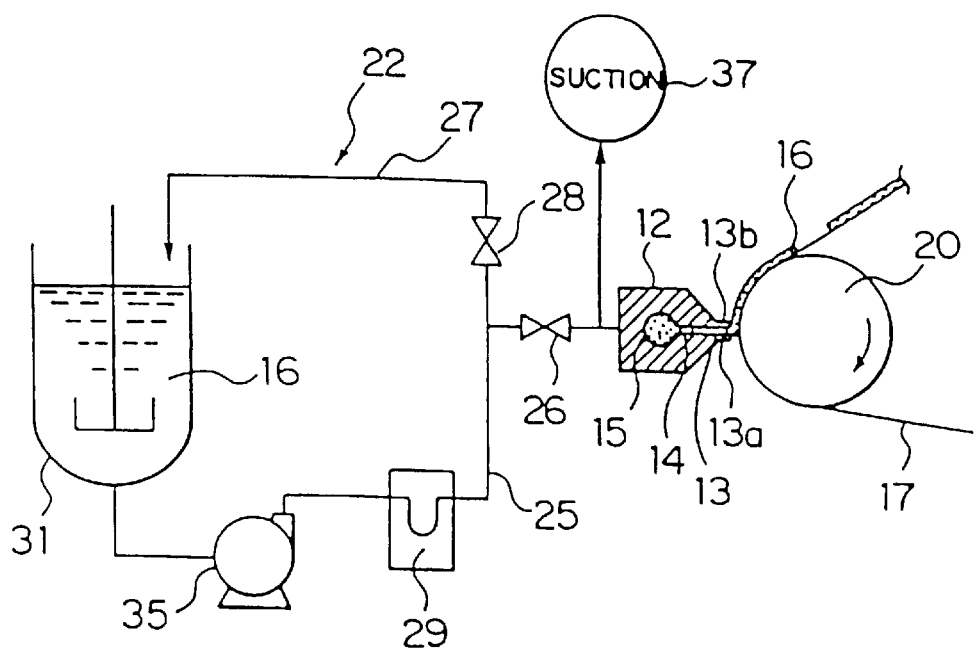
FIG. 3 is a diagram schematically showing one embodiment of a coating device used in the method of manufacturing a sheet electrode plate according the invention.

FIG. 3 is a diagram schematically showing the coating device used in the method of manufacturing a sheet electrode plate of the invention.

Figure 4:
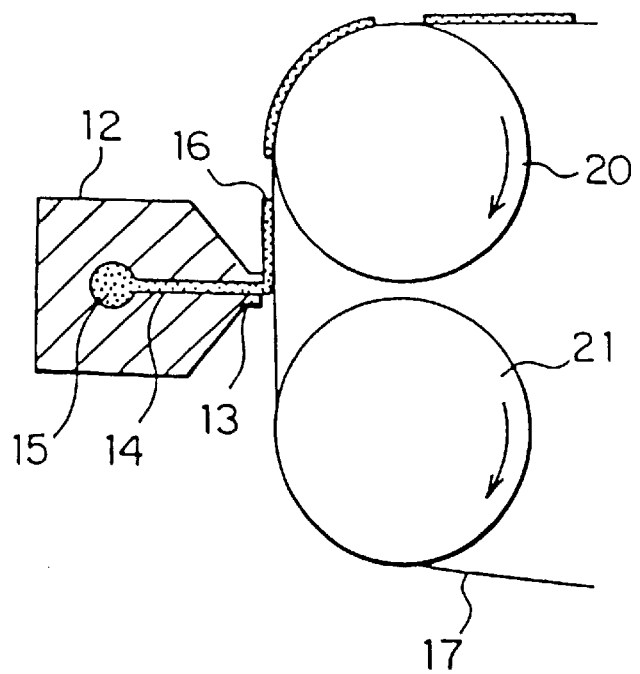
FIG. 4 is a diagram showing another embodiment of disposing the die nozzle of the above coating device.

In this coating device, a die nozzle 12 is disposed such that a conductive base material 17 is continuously traveled in close contact with the surface of a revolving backup roll 20, and the tip of a lip 13 is opposed to the conductive base material 17 with a certain distance between them. The die nozzle 12 is preferably disposed so that the lip 13 is exactly square to the coating surface of the conductive base material 17, but may be disposed at another angle other than the right angle. The backup roll 20 serves to keep the space between the conductive base material 17 and the die nozzle 12 (the tip of the lip 13) and to keep the conductive base material 17 at a constant travelling speed. And, as shown in FIG. 4, the die nozzle 12 can also be disposed so that the conductive base material 17 is travelled in close contact with the neighboring roll surfaces of the backup roll 20 and a guide roll 21, and the tip of the lip 13 is kept with a predetermined space away from the conductive base material 17 at the middle of these rolls.

The die nozzle 12 has two lips 13 (an inlet lip 13a, an outlet lip 13b) which are mutually opposed with a predetermined gap therebetween, and a land 14 is formed of these lips 13. And, the die nozzle 12 has a manifold 15 which is communicated with the land 14 and keeps a liquid in it. The manifold 15 serves to relieve a change of the supplied amount of the coating liquid. An electrode material coating liquid 16 is quantitatively supplied to the manifold 15 by a coating liquid supply system 22 which is disposed outside of the die nozzle 12, and injected from the tips of the lips 13 through the land 14.

The coating liquid supply system 22 has a coating liquid tank 31 which keeps the prepared electrode material coating liquid 16, a constant rate pump 35 which continuously supplies the coating liquid 16 kept in the tank 31 to the manifold 15 of the die nozzle 12, a supply passage (supply path) 25 which connects the coating liquid tank 31 and the die nozzle 12, a discharge valve 26 which is disposed on the supply passage 25, a return passage 27 which is branched (the upstream of the discharge valve 26) from the supply passage 25, and a return valve 28 which is disposed on the return passage 27. Reference numeral 29 in FIG. 3 denotes a flow meter.

By the die nozzle 12 which is communicated with the coating liquid supply system 22, the prepared electrode material coating liquid 34 is continuously supplied from the supply liquid tank 31 into the manifold 15 of the die nozzle 12 through the supply passage 25 by the constant rate pump 35. And, the coating liquid 16 supplied to the manifold 15 is injected from the outlet at the tips of the lips 13 through the land 14 and coated onto the conductive base material 17 which is continuously travelling.

To form the uncoated areas on the conductive base material 17 at predetermined intervals in the longitudinal direction, the following four types of flowing are available.

1) Upon closing the discharge valve 26 and releasing the return valve 28, the die nozzle 12, namely the tips of the lips 13, is moved in a direction to separate it from the conductive base material 17 to form the uncoated areas. The die nozzle 12 may be moved in a direction perpendicular to the coating surface of the conductive base material 17 or in a direction substantially perpendicular but at an angle other than the right angle. And, the die nozzle 12 is preferably moved linearly but may be moved curvilinearly.

2) Upon closing the discharge valve 26 and releasing the return valve 28, the die nozzle 12 is swung or pivoted about an appropriate point in a direction parallel (traveling direction or its opposite direction) to a direction that the conductive base material is traveled such that the tips of the lips 13 are moved to retract upwards or downwards to form the uncoated areas. The center for pivoting may be the center of gravity of the die nozzle 12 or another point.

3) Upon closing the discharge valve 26 and releasing the return valve 28, the conductive base material 17 is moved in a direction substantially perpendicular to the tip faces of the lips 13 of the die nozzle 12 to separate from the tips of the lips 13, thereby forming the uncoated areas.

4) Neither the die nozzle 12 or the conductive base material is moved, and the electrode material coating liquid 34 is intermittently supplied to the die nozzle 12 by the coating liquid supply system 22, and the supply of the coating liquid to the die nozzle 12 is completely suspended at predetermined time intervals to form the uncoated areas.

Specifically, in the coating liquid supply system 22, the injection valve 26 is closed to stop the coating liquid from being supplied to the die nozzle 12 and the return valve 28 is opened, and the coating liquid 16 is returned to the coating liquid tank 31 through the return passage 27. When the coating liquid is started to be supplied, the return valve 28 is closed and the injection valve 26 is opened at the same time, and the coating liquid 34 is supplied into the manifold 15 of the die nozzle 12 through the injection valve 26.

Figure 5:
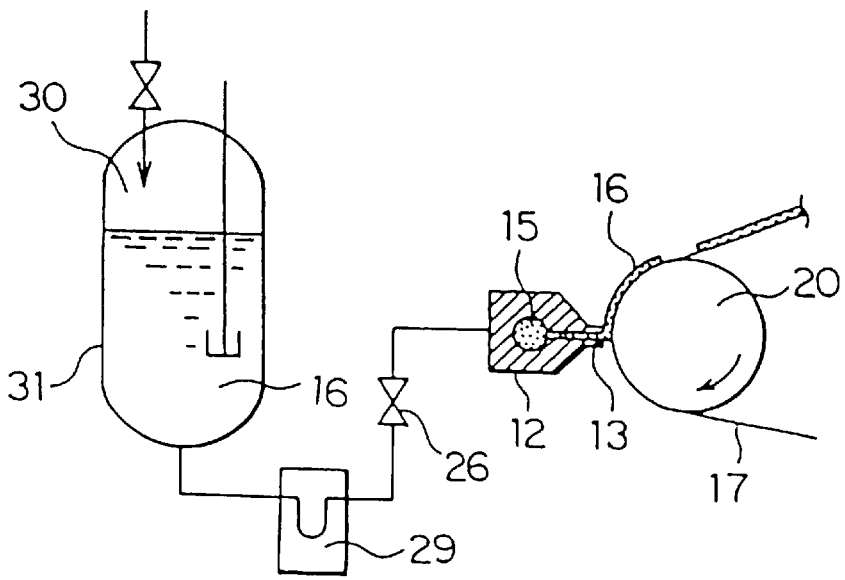
FIG. 5 is a diagram showing another embodiment of an intermittent supply system for the coating liquid in the coating device used according to the invention.

And, the supply of the coating liquid to the die nozzle 12 can also be stopped by closing the injection valve 26 and stopping the constant rate pump 35 without using the return passage 27. Besides, as shown in FIG. 5, it is configured that an inert gas 30 such as nitrogen or argon is fed under pressure into the enclosed tank 31 which contains the coating liquid to supply the coating liquid 16, and this coating liquid supply system can suspend the supply of the coating liquid to the die nozzle 12 by merely opening or closing the injection valve 26 to form the uncoated areas. While flowing, it is desirable to operate at the same time a means, e.g., a suction mechanism 37, to instantaneously release the pressure remained in the manifold 15 just after stopping supplying.

In the above supply methods 1) to 4), the tips of the lips 13 of the die nozzle 12 are preferably disposed to face a direction substantially perpendicular to the coating surface of the conductive base material 17 but may also be disposed at an angle other than the right angle. And, the intermittent method of supplying the coating liquid to the die nozzle 12 indicated in 4) above is preferably performed together with the other methods 1) to 3).

Now, the invention will be described in further detail referring to specific embodiments.

EMBODIMENT 1

A cathode mix coating liquid having a solid content concentration of 60% by weight was prepared by mixing and dispersing 55.2 parts by weight of $LiCoO_2$ as the cathode active material, 3.6 parts by weight of acetylene black as the conductive agent, 1.2 parts by weight of a fluororubber based binder as the binding agent, and 40 parts by weight of ethyl acetate as the solvent. This coating liquid had an apparent viscosity of 3000 mPa·S (a shear rate of 13 $sec^{-1}$).

This slurry-like coating liquid was coated to both surfaces of an aluminum foil having a thickness of 15 μm one surface at a time with uncoated areas formed at predetermined intervals in the longitudinal direction by means of the coating device shown in FIG. 3 according to the method 1) above, and the formed layers were dried in hot air at 120° C. While the coating liquid was being coated, a space between the tips of the lips and the aluminum foil as the conductive base material was 0.4 mm, and when the coating was suspended, a distance that the die nozzle was moved backward was 5 mm in a direction perpendicular to the aluminum foil, and a coating speed, namely, a travelling speed of the aluminum foil, was 2 m/min. And, the coating liquid was supplied to the die nozzle by employing the intermittent supply system at the same time.

EMBODIMENT 2

A cathode mix coating liquid having a solid content concentration of 65% by weight and an apparent viscosity of 25000 mPa·S (a shear rate of 13 sec$^{-1}$) was prepared by kneading LiCoO$_2$, acetylene black, a fluororubber-based binder and ethyl acetate in the same way as in Embodiment 1. This coating liquid was coated to both surfaces of an aluminum foil one surface at a time with uncoated areas formed at predetermined intervals in the longitudinal direction in the same way as in Embodiment 1.

EMBODIMENT 3

A cathode mix coating liquid having a solid content concentration of 70% by weight and an apparent viscosity of 40000 mPa·S (a shear rate of 13 sec$^{-1}$) was prepared by kneading LiCoO$_2$, acetylene black, a fluororubber-based binder and ethyl acetate in the same way as in Embodiment 1. This coating liquid was coated to both surfaces of an aluminum foil one surface at a time with uncoated areas formed at predetermined intervals in the longitudinal direction in the same way as in Embodiment 1.

EMBODIMENT 4

An anode mix coating liquid having a solid content concentration of 60% by weight was prepared by kneading and dispersing 58.2 parts by weight of fibrous carbon as the anode active material, 1.2 parts by weight of a copolymerized compound of styrene and butadiene as the binding agent, 0.6 part by weight of carboxymethylcellulose as the thickening agent, and 40 parts by weight of pure water as the solvent. This coating liquid had an apparent viscosity of 3000 mPa·S (a shear rate of 13 sec$^{-1}$).

This slurry-like coating liquid was coated to both surfaces of a copper foil having a thickness of 12 μm one surface at a time with uncoated areas formed at predetermined intervals in the longitudinal direction by means of the coating device shown in FIG. 3 according to the method 1) above, and the formed layers were dried in hot air at 100° C. While the coating liquid was being coated, a space between the tips of the lips and the copper foil as the conductive base material was 0.3 mm, and when the coating was suspended, a distance that the die nozzle was moved backward was 5 mm in a direction perpendicular to the copper foil, and a coating speed was 2 m/min. And, the coating liquid was supplied to the die nozzle by employing the intermittent supply system at the same time.

EMBODIMENT 5

An anode mix coating liquid having a solid content concentration of 64% by weight and an apparent viscosity of Or 10000 mPa·S (a shear rate of 13 sec$^{-1}$) was prepared by kneading fibrous carbon, styrene-butadiene copolymerized compound, carboxymethylcellulose and pure water in the same way as in Embodiment 4. This coating liquid was coated to both surfaces of a copper foil one surface at a time with uncoated areas formed at predetermined intervals in the longitudinal direction in the same way as in Embodiment 4.

EMBODIMENT 6

An anode mix coating liquid having a solid content concentration of 68% by weight and an apparent viscosity of 20000 mPa·S (a shear rate of 13 sec$^{-1}$) was prepared by kneading fibrous carbon, styrene-butadiene copolymerized compound, carboxymethylcellulose and pure water in the same way as in Embodiment 4. This coating liquid was coated to both surfaces of a copper foil one surface at a time with uncoated areas formed at predetermined intervals in the longitudinal direction in the same way as in Embodiment 4.

EMBODIMENT 7

The same cathode mix coating liquid (a solid content concentration of 60% by weight and an apparent viscosity of 3000 mPa·S) as in Embodiment 1 was coated to both surfaces of an aluminum foil one surface at a time with uncoated areas formed at predetermined intervals in the longitudinal direction by means of the coating device shown in FIG. 3 according to the method 2) above. While the coating liquid was being coated, a space between the tips of the lips and the aluminum foil as the conductive base material was 0.4 mm, and when coating was stopped, the die nozzle was retracted at an angle of 3° in a direction opposite to the travelling direction of the aluminum foil, and the coating speed was 2 m/min. And, the coating liquid was supplied to the die nozzle by employing the intermittent supply system at the same time.

EMBODIMENT 8

The same cathode mix coating liquid (a solid content concentration of 65% by weight and an apparent viscosity of 25000 mPa·S) as in Embodiment 2 was coated to both surfaces of an aluminum foil with uncoated areas formed at predetermined intervals in the longitudinal direction by the same method as in Embodiment 7.

EMBODIMENT 9

The same cathode mix coating liquid (a solid content concentration of 70% by weight and an apparent viscosity of 40000 mPa·S) as in Embodiment 3 was coated to both surfaces of an aluminum foil one surface at a time with uncoated areas formed at predetermined intervals in the longitudinal direction by the same method as in Embodiment 7.

EMBODIMENT 10

The same cathode mix coating liquid (a solid content concentration of 60% by weight and an apparent viscosity of 3000 mPa·S) as in Embodiment 4 was coated to both surfaces of a copper foil one surface at a time with uncoated areas formed at predetermined intervals in the longitudinal direction by means of the coating device shown in FIG. 3 according to the method 2) above. While the coating liquid was being coated, a space between the tips of the lips and the copper foil as the conductive base material was 0.3 mm, and when coating was stopped, the die nozzle was retracted at an angle of 3° in a direction opposite to the travelling direction of the copper foil, and the coating speed was 2 m/min. And, the coating liquid was supplied to the die nozzle by employing the intermittent supply system at the same time.

EMBODIMENT 11

The same cathode mix coating liquid (a solid content concentration of 64% by weight and an apparent viscosity of 10000 mPa·S) as in Embodiment 5 was coated to both surfaces of a copper foil one surface at a time with uncoated areas formed at predetermined intervals in the longitudinal direction by the same method as in Embodiment 10.

EMBODIMENT 12

The same cathode mix coating liquid (a solid content concentration of 68% by weight and an apparent viscosity of 20000 mPa·S) as in Embodiment 6 was coated to both surfaces of a copper foil one surface at a time with uncoated areas formed at predetermined intervals in the longitudinal direction by the same method as in Embodiment 10.

EMBODIMENT 13

The same cathode mix coating liquid (a solid content concentration of 60% by weight and an apparent viscosity of 3000 mPa·S) as in Embodiment 1 was coated to both surfaces of an aluminum foil one surface at a time with uncoated areas formed at predetermined intervals in the longitudinal direction by means of the coating device shown in FIG. 3 according to the method 2) above. While the coating liquid was being coated, a space between the tips of the lips and the aluminum foil as the conductive base material was 0.4 mm, and when the coating was stopped, the aluminum foil was moved backward by a distance of 5 mm in a direction perpendicular to the tip face of the die nozzle, and the coating speed was 2 m/min. And, the coating liquid was supplied to the die nozzle by employing the intermittent supply system at the same time.

EMBODIMENT 14

The same cathode mix coating liquid (a solid content concentration of 65% by weight and an apparent viscosity of 25000 mPa·S) as in Embodiment 2 was coated to both surfaces of an aluminum foil one surface at a time with uncoated areas formed at predetermined intervals in the longitudinal direction by the same method as in Embodiment 13.

EMBODIMENT 15

The same cathode mix coating liquid (a solid content concentration of 70% by weight and an apparent viscosity of 40000 mPa·S) as in Embodiment 3 was coated to both surfaces of an aluminum foil one surface at a time with uncoated areas formed at predetermined intervals in the longitudinal direction by the same method as in Embodiment 13.

EMBODIMENT 16

The same anode mix coating liquid (a solid content concentration of 60% by weight and an apparent viscosity of 3000 mPa·S) as in Embodiment 4 was coated to both surfaces of a copper foil one surface at a time with uncoated areas formed at predetermined intervals in the longitudinal direction by means of the coating device shown in FIG. 3 according to the method 3) above. While the coating liquid was being coated, a space between the tips of the lips and the copper foil as the conductive base material was 0.3 mm, and when the coating was stopped, the copper foil was moved backward by a distance of 5 mm in a direction perpendicular to the tip face of the die nozzle, and the coating speed was 2 m/min. And, the coating liquid was supplied to the die nozzle by employing the intermittent supply system at the same time.

EMBODIMENT 17

The same anode mix coating liquid (a solid content concentration of 64% by weight and an apparent viscosity of 10000 mPa·S) as in Embodiment 5 was coated to both surfaces of a copper foil one surface at a time with uncoated areas formed at predetermined intervals in the longitudinal direction by the same method as in Embodiment 16.

EMBODIMENT 18

The same anode mix coating liquid (a solid content concentration of 68% by weight and an apparent viscosity of 20000 mPa·S) as in Embodiment 6 was coated to both surfaces of a copper foil one surface at a time with uncoated areas formed at predetermined intervals in the longitudinal direction by the same method as in Embodiment 16.

EMBODIMENT 19

The same cathode mix coating liquid (a solid content concentration of 60% by weight and an apparent viscosity of 3000 mPa·S) as in Embodiment 1 was coated to both surfaces of an aluminum foil one surface at a time with uncoated areas formed at predetermined intervals in the longitudinal direction by means of the coating device shown in FIG. 3 according to the method of intermittently supplying the coating liquid to the die nozzle indicated in 4) above. While the coating liquid was being coated or stopped from being coated, a space between the tips of the lips and the aluminum foil as the conductive base material was 0.4 mm, and the coating speed was 2 m/min.

EMBODIMENT 20

The same cathode mix coating liquid (a solid content concentration of 65% by weight and an apparent viscosity of 25000 mPa·S) as in Embodiment 2 was coated to both surfaces of an aluminum foil one surface at a time with uncoated areas formed at predetermined intervals in the longitudinal direction by the same method as in Embodiment 19.

EMBODIMENT 21

The same cathode mix coating liquid (a solid content concentration of 70% by weight and an apparent viscosity of 40000 mPa·S) as in Embodiment 3 was coated to both surfaces of an aluminum foil one surface at a time with uncoated areas formed at predetermined intervals in the longitudinal direction by the same method as in Embodiment 19.

EMBODIMENT 22

The same anode mix coating liquid (a solid content concentration of 60% by weight and an apparent viscosity of 3000 mPa·S) as in Embodiment 4 was coated to both surfaces of a copper foil one surface at a time with uncoated areas formed at predetermined intervals in the longitudinal direction by means of the coating device shown in FIG. 3 according to the method of intermittently supplying the coating liquid to the die nozzle indicated in 4) above. While the coating liquid was being coated or suspended from being coated, a space between the tips of the lips and the copper foil as the conductive base material was 0.3 mm, and the coating speed was 2 m/min.

EMBODIMENT 23

The same anode mix coating liquid (a solid content concentration of 64% by weight and an apparent viscosity of 10000 mPa·S) as in Embodiment 5 was coated to both surfaces of a copper foil one surface at a time with uncoated areas formed at predetermined intervals in the longitudinal direction by the same method as in Embodiment 22.

EMBODIMENT 24

The same anode mix coating liquid (a solid content concentration of 68% by weight and an apparent viscosity of 20000 mPa·S) as in Embodiment 6 was coated to both surfaces of a copper foil one surface at a time with uncoated areas formed at predetermined intervals in the longitudinal direction by the same method as in Embodiment 22.

COMPARATIVE EMBODIMENT 1

A cathode mix coating liquid having a solid content concentration of 50% by weight and an apparent viscosity of 450 mPa·S (a shear rate of 13 sec$^{-1}$) was prepared by kneading LiCoO$_2$, acetylene black, a fluororubber-based binder and ethyl acetate in the same way as in Embodiment 1. This coating liquid was coated to both surfaces of an aluminum foil one surface at a time with uncoated areas formed at predetermined intervals in the longitudinal direction by means of the coating device shown in FIG. 3 according to the method indicated in 2) above in the same way as in Embodiment 7.

COMPARATIVE EMBODIMENT 2

A cathode mix coating liquid having a solid content concentration of 75% by weight and an apparent viscosity of 120000 mPa·S (a shear rate of 13 sec$^{-1}$) was prepared by kneading LiCoO$_2$, acetylene black, a fluororubber-based binder and ethyl acetate in the same way as in Embodiment 1. This coating liquid was coated to both surfaces of an aluminum foil one surface at a time with uncoated areas formed at predetermined intervals in the longitudinal direction by means of the coating device shown in FIG. 3 according to the method indicated in 2) above in the same way as in Embodiment 7.

COMPARATIVE EMBODIMENT 3

An anode mix coating liquid having a solid content concentration of 45% by weight and an apparent viscosity of 420 mPa·S (a shear rate of 13 sec$^{-1}$) was prepared by kneading fibrous carbon, styrene-butadiene copolymerized compound, carboxymethylcellulose and pure water in the same way as in Embodiment 4. This coating liquid was coated to both surfaces of a copper foil one surface at a time with uncoated areas formed at predetermined intervals in the longitudinal direction by means of the coating device shown in FIG. 3 according to the method indicated in 2) above in the same way as in Embodiment 10.

COMPARATIVE EMBODIMENT 4

An anode mix coating liquid having a solid content concentration of 70% by weight and an apparent viscosity of 110000 mPa·S (a shear rate of 13 sec$^{-1}$) was prepared by kneading fibrous carbon, styrene-butadiene copolymerized compound, carboxymethylcellulose and pure water in the same way as in Embodiment 4. This coating liquid was coated to both surfaces of a copper foil one surface at a time with uncoated areas formed at predetermined intervals in the longitudinal direction by means of the coating device shown in FIG. 3 according to the method indicated in 2) above in the same way as in Embodiment 10.

COMPARATIVE EMBODIMENT 5

The same cathode mix coating liquid (a solid content concentration of 60% by weight and an apparent viscosity of 3000 mPa·S) as in Embodiment 1 was coated to both surfaces of an aluminum foil one surface at a time with uncoated areas formed at predetermined intervals in the longitudinal direction by a reverse roll method which stops coating when the backup roll is separated. The coating speed was 2 m/min.

COMPARATIVE EMBODIMENT 6

The same cathode mix coating liquid (a solid content concentration of 65% by weight and an apparent viscosity of 25000 mPa·S) as in Embodiment 2 was coated to both surfaces of an aluminum foil one surface at a time with uncoated areas formed at predetermined intervals in the longitudinal direction by the same method as in Comparative Embodiment 5.

COMPARATIVE EMBODIMENT 7

The same cathode mix coating liquid (a solid content concentration of 70% by weight and an apparent viscosity of 40000 mPa·S) as in Embodiment 3 was coated to both surfaces of an aluminum foil one surface at a time with uncoated areas formed at predetermined intervals in the longitudinal direction by the same method as in Comparative Embodiment 5.

COMPARATIVE EMBODIMENT 8

The same cathode mix coating liquid (a solid content concentration of 50% by weight and an apparent viscosity of 450 mPa·S) as in Comparative Embodiment 1 was coated to both surfaces of an aluminum foil one surface at a time with uncoated areas formed at predetermined intervals in the longitudinal direction by the same method as in Comparative Embodiment 5.

COMPARATIVE EMBODIMENT 9

The same cathode mix coating liquid (a solid content concentration of 75% by weight and an apparent viscosity of 120000 mPa·S) as in Comparative Embodiment 2 was coated to both surfaces of an aluminum foil one surface at a time with uncoated areas formed at predetermined intervals in the longitudinal direction by the same method as in Comparative Embodiment 5.

COMPARATIVE EMBODIMENT 10

The same anode mix coating liquid (a solid content concentration of 60% by weight and an apparent viscosity of 3000 mPa·S) as in Embodiment 4 was coated to both surfaces of a copper foil one surface at a time with uncoated areas formed at predetermined intervals in the longitudinal direction by the same method as in Comparative Embodiment 5.

COMPARATIVE EMBODIMENT 11

The same anode mix coating liquid (a solid content concentration of 64% by weight and an apparent viscosity of 10000 mPa·S) as in Embodiment 5 was coated to both surfaces of a copper foil one surface at a time with uncoated areas formed at predetermined intervals in the longitudinal direction by the same method as in Comparative Embodiment 5.

COMPARATIVE EMBODIMENT 12

The same anode mix coating liquid (a solid content concentration of 68% by weight and an apparent viscosity of 20000 mPa·S) as in Embodiment 6 was coated to both surfaces of a copper foil one surface at a time with uncoated areas formed at predetermined intervals in the longitudinal direction by the same method as in Comparative Embodiment 5.

COMPARATIVE EMBODIMENT 13

The same anode mix coating liquid (a solid content concentration of 45% by weight and an apparent viscosity of 420 mPa·S) as in Comparative Embodiment 3 was coated to both surfaces of a copper foil one surface at a time with uncoated areas formed at predetermined intervals in the longitudinal direction by the same method as in Comparative Embodiment 5.

COMPARATIVE EMBODIMENT 14

The same anode mix coating liquid (a solid content concentration of 70% by weight and an apparent viscosity of 110000 mPa·S) as in Comparative Embodiment 4 was coated to both surfaces of a copper foil one surface at a time with uncoated areas formed at predetermined intervals in the longitudinal direction by the same method as in Comparative Embodiment 5.

Figure 6:
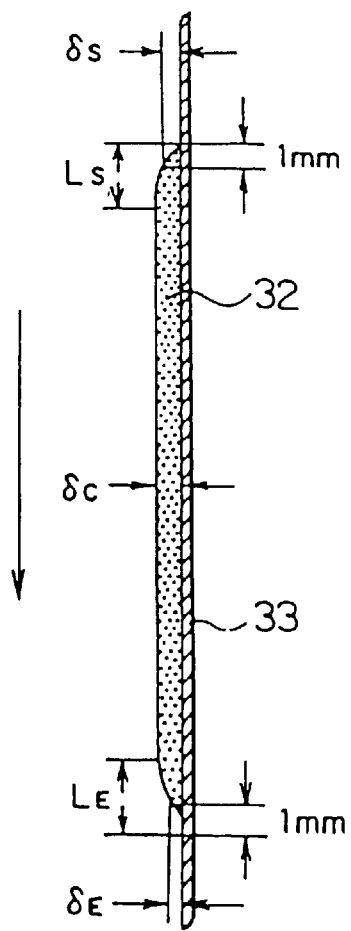
FIG. 6 is a sectional view along a coated direction on a coating sheet obtained according to the invention.

The coated sheets for cathode and the coated sheets for anode prepared in Embodiments 1 to 24 and Comparative Embodiments 1 to 14 were measured for each coated thickness to examine uniformity and stability of the coated thickness. Specifically, referring to a sectional view of the coated sheet shown in FIG. 6, when it was assumed that a coated thickness at the center of the coated area where a coated layer 32 had a stable thickness was $\delta_C$, a difference $\delta_{C-S}(\delta_C-\delta_S)$ between the value ($\delta_C$) and a coated thickness $\delta_S$ at a position 1 mm from the position where coating was started, a difference $\delta_{C-E}(\delta_C-\delta_E)$ between the value ($\delta_C$) and a coated thickness $\delta_E$ at a position 1 mm short of terminating the coating, a length $L_S$ from the start of coating until the coated thickness became uniform, and a length $L_E$ from the point where the coated thickness was uniform to the point where the coating was terminated were measured. In the drawing, reference numeral 33 denotes an aluminum foil or a copper foil. And, a direction that the liquid is coated is indicated by an arrow. The measured results are shown in Table 1 and Table 2.

obtained coated sheet had good uncoated areas completely free from the electrode mix coating liquid. And, electrodes were prepared from the prepared sheets and used to produce nonaqueous electrolyte batteries by a conventional procedure. The batteries produced were good in performance and safety.

On the other hand, the coated sheets produced in Comparative Embodiments 1 to 14 had the uncoated areas in a good condition, but the coating liquid was not clearly stopped at the boundary between the coated area and the uncoated area, causing the coated layer to bulge at the end of the coated area or a coated thickness to be extremely thin. As a result, when the obtained coated sheet was compression-molded by a roller press, the coated sheet having the bulged coated layer had the conductive base material cut. And, when the coated sheet having an extremely thin coated layer was used to produce a battery, its performance and safety were too low to practically use for the battery.

As described above, it is apparent that the invention can efficiently form the good uncoated areas, where there is no electrode mix coating liquid, to produce a sheet electrode plate having good characteristics. And, since the uncoated areas are formed when the coating liquid is coated, it is not necessary to peel the electrode mix layer to weld a tab plate, the number of manhour is decreased to save labor, and efficiency of the coating process can be improved.

Now, the invention will be described with reference to the accompanying drawings.

Figure 7:
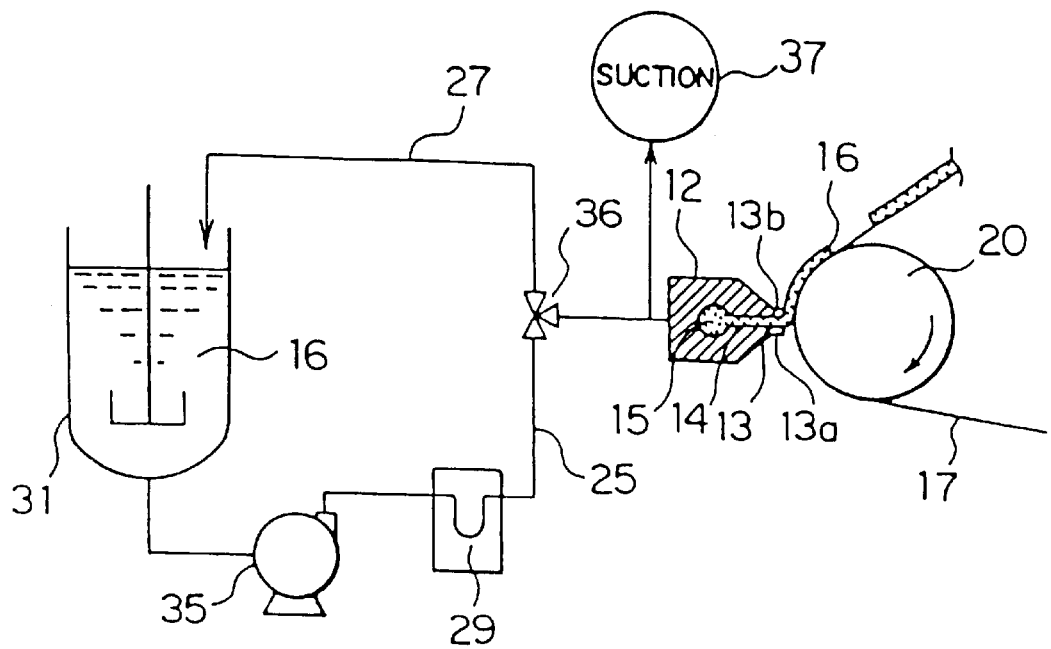
FIG. 7 is a diagram schematically showing one embodiment of a coating device used for a manufacturing method of the sheet electrode plate according to the invention.

FIG. 7 is a diagram schematically showing a coating device used for a manufacturing method of the sheet electrode plate according to the invention.

In this coating device, a die nozzle 12 is disposed such that a conductive base material 17 is moved continuously in close contact with the roll surface of a revolving backup roll 20, and the tips of lips 13 are kept a predetermined space away from the conductive base material 17. The die nozzle 12 has two lips 13 (an inlet lip 13a, an outlet lip 13b) which are mutually opposed with an appropriate gap therebetween, and a land 14 is formed of these lips 13. And, the die nozzle

TABLE 1

| | Embodiments | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| $\delta_{C-S}$ ($\delta_C-\delta_S$) (μm) | 7 | 5 | 3 | 2 | 2 | 2 | 6 | 6 | 3 | 3 | 2 | 2 | 7 | 5 | 2 | 2 | 3 | 3 | 8 | 6 | 5 | 8 | 6 | 7 |
| $\delta_{C-E}$ ($\delta_C-\delta_E$) (μm) | 5 | 8 | 6 | 8 | 5 | 3 | 6 | 7 | 6 | 7 | 5 | 4 | 6 | 7 | 5 | 7 | 5 | 4 | 7 | 4 | 3 | 4 | 3 | 6 |
| $L_S$ (mm) | 3 | 2 | 2 | 3 | 2 | 2 | 3 | 2 | 3 | 3 | 2 | 2 | 3 | 3 | 2 | 3 | 3 | 2 | 3 | 4 | 4 | 3 | 4 | 3 |
| $L_E$ (mm) | 3 | 3 | 3 | 2 | 2 | 2 | 3 | 3 | 2 | 3 | 2 | 3 | 2 | 3 | 2 | 3 | 2 | 3 | 3 | 3 | 4 | 4 | 4 | 4 |

TABLE 2

| | Comparative Embodiments | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| $\delta_{C-S}$ ($\delta_C-\delta_S$) (μm) | 47 | −23 | 34 | −25 | −18 | −21 | −25 | 19 | −37 | −22 | −24 | −28 | 21 | −31 |
| $\delta_{C-E}$ ($\delta_C-\delta_E$) (μm) | 23 | −4 | 28 | −2 | −8 | −8 | −10 | 16 | −25 | −16 | −15 | −18 | 19 | −24 |
| $L_S$ (mm) | 16 | 10 | 23 | 12 | 17 | 24 | 25 | 22 | 16 | 13 | 21 | 26 | 24 | 19 |
| $L_E$ (mm) | 18 | 5 | 28 | 10 | 6 | 15 | 4 | 19 | 6 | 5 | 7 | 7 | 26 | 6 |

It was apparent from Embodiments 1 to 24 that each coated area had a uniform and stable coated thickness from the point immediately after starting to apply the coating liquid to the point the coating was terminated, and the 12 has a manifold 15 which is communicated with the land 14 and keeps the coating liquid in it. The manifold 15 serves to relieve a change of the supplied amount of the coating liquid. An electrode mix coating liquid 16 is supplied to the manifold 15 by a coating liquid supply system which is disposed outside of the die nozzle 12, and injected from the outlet formed at the tips of the lips 13 through the land 14 to be coated onto the conductive base material 17.

The coating liquid supply system has a coating liquid tank 31 which keeps the electrode mix coating liquid 16, a liquid feeding pump 35 which feeds the coating liquid 16 kept in the tank 31, a supply passage (supply path) 25 which connects the coating liquid tank 31 and the die nozzle 12, a return passage 27 which is branched from the supply passage 25, and a three-way valve 36 which is disposed at a branch joint of the return passage. And, the prepared electrode mix coating liquid 16 is pumped out of the coating liquid tank 31 by the liquid feeding pump 35 and supplied to the die nozzle 12 through the supply passage 25. This supply system switches an open-close direction of the three-way valve 36 from a direction to supply to the die nozzle 12 to a direction to the return passage 27 with predetermined timing to supply intermittently the coating liquid to the die nozzle 12, and when the supply is stopped, the coating liquid 16 is returned to the coating liquid tank 31 through the return passage 27. Reference numeral 29 denotes a flow meter and 37 a suction mechanism in FIG. 7. The suction mechanism 37 is disposed to seal the tank 31 under pressure and to instantaneously release the pressure remained in the manifold 15 when the uncoated area is formed by simply opening and closing the three-way valve 36 to stop supplying the coating liquid to the die nozzle 12.

By the coating device having the above coating liquid supply system, the electrode mix coating liquid 16 is coated sequentially or simultaneously to front and back surfaces of the conductive base material 17 and dried in hot air. Then, a coated sheet is compressed under predetermined pressure by being passed through a roller press to be described below.

Figure 8:
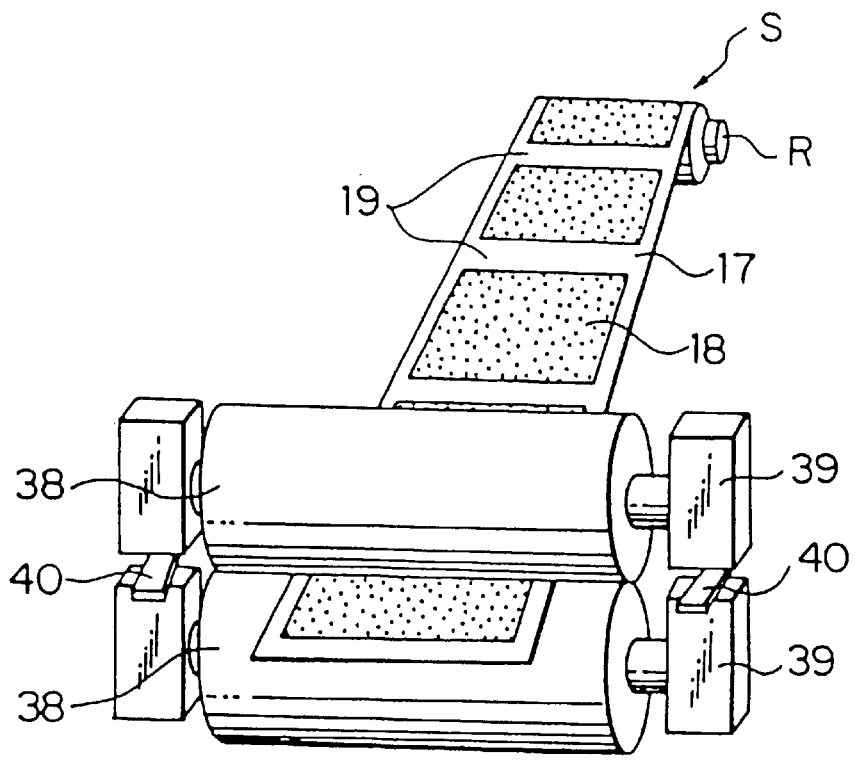
FIG. 8 is perspective view showing one embodiment of the roller press used for a manufacturing method of the sheet electrode plate according to the invention.

As shown in FIG. 8, the roller press comprises a pair of press rollers 38 disposed to oppose mutually and housings 39 which include a pressurizing mechanism and support both ends of the rotation shaft of each roller 38, and a gap spacer 40 which has a thickness equal to or larger than 0.6 time of a thickness d of the conductive base material 17 and equal to or less than a target thickness $D_0$ is held between the respective housings 39 which are disposed to oppose vertically. Thus, a space (gap) equivalent to the thickness of the gap spacer 40 is formed between the main surfaces of the rollers 38, and a coated sheet S which has uncoated areas 19 formed at predetermined intervals in the longitudinal direction of the conductive base material 17 is pressurized and compressed by being passed between the main surfaces of the rollers 38. Reference numeral 18 denotes a coated area and R a delivery roll.

In this way, the coated sheet S is compressed without stretching or cutting the conductive base material 17, and a sheet electrode plate having an electrode mix layer with a high activating material charging density is produced.

Now, the invention will be described in further detail referring to specific embodiments, but it is to be understood that the invention is not limited to the following embodiments unless they depart from the objects of the invention.

EMBODIMENT 25

A slurry-like coating liquid having a solid content concentration of 60% by weight and an apparent viscosity of 3000 mPa·S (a shear rate of 13 sec$^{-1}$) was prepared by mixing 90 parts by weight of LiCoO$_2$ as the cathode active material and 6 parts by weight of acetylene black as the conductive agent, adding 2 parts by weight of a fluororubber-based binder as the binding agent, adding ethyl acetate as the solvent, and kneading them.

Figure 9:
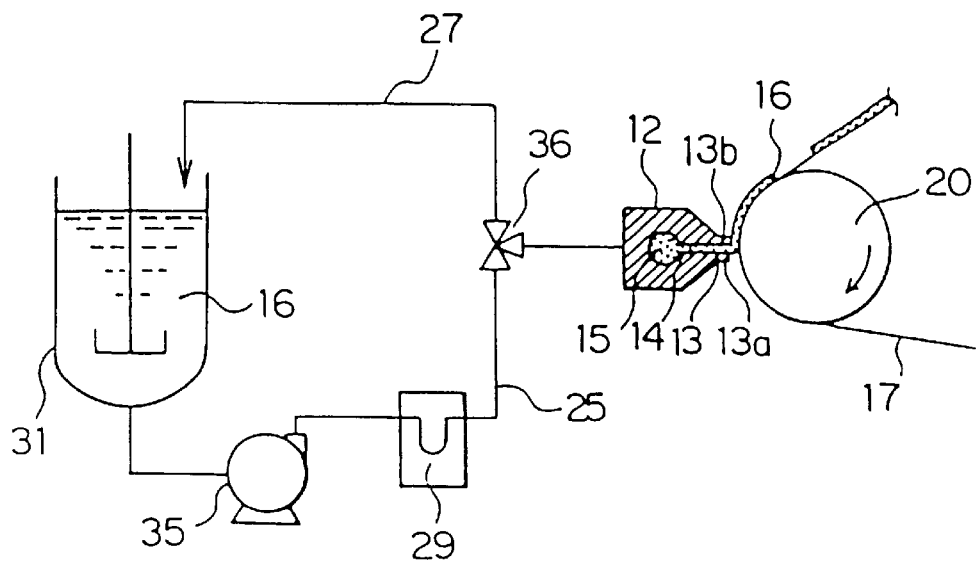
FIG. 9 is a diagram schematically showing one embodiment of a coating device used for a manufacturing method of the sheet electrode plate according to the invention.

This coating liquid was coated to both surfaces of an aluminum foil having a thickness of 15 μm one surface at a time with uncoated areas formed at predetermined intervals in the longitudinal direction by means of the coating device shown in FIG. 9 with the tips of the lips of the die nozzle separated in a direction perpendicular to the coating surface of the aluminum foil. After drying in hot air, the obtained coating sheet (electrode sheet with a width of 100 mm and a thickness of 260 μm) was compressed by being passed between the metal-metal rollers having a diameter of 200 mm of the roller press shown in FIG. 10 to produce a cathode sheet having a thickness of about 185 μm (a target thickness of 185 μm). At this time, compression was made under conditions of a linear pressure of 500 kg/cm, a speed of 2 m/min, a roller temperature of 25° C., and a gap spacer thickness (equal to the gap D between the rollers) of 15 μm.

EMBODIMENT 26

A cathode sheet was produced by the same procedure as in Embodiment 25 except that the line pressure at pressing (pressurizing) was changed to 750 kg/cm as shown in Table 3.

EMBODIMENT 27

A cathode sheet was produced by the same procedure as in Embodiment 25 except that the line pressure at pressing was changed to 1000 kg/cm as shown in Table 3.

EMBODIMENT 28

A cathode sheet was produced by the same procedure as in Embodiment 25 except that the line pressure at pressing was changed to 300 kg/cm and the roller temperature was changed to 60° C. as shown in Table 3.

EMBODIMENT 29

A cathode sheet was produced by the same procedure as in Embodiment 28 except that the line pressure at pressing was changed to 500 kg/cm as shown in Table 3.

EMBODIMENT 30

A cathode sheet was produced by the same procedure as in Embodiment 28 except that the line pressure at pressing was changed to 750 kg/cm as shown in Table 3.

EMBODIMENT 31

A cathode sheet was produced by the same procedure as in Embodiment 28 except that the gap spacer thickness, namely the gap D between the rollers, was changed to 12 μm as shown in Table 3.

EMBODIMENT 32

A cathode sheet was produced by the same procedure as in Embodiment 31 except that the line pressure at pressing was changed to 500 kg/cm as shown in Table 3.

EMBODIMENT 33

A cathode sheet was produced by the same procedure as in Embodiment 32 except that the gap spacer thickness, namely the gap D between the rollers, was changed to 30 μm as shown in Table 3.

EMBODIMENT 34

A cathode sheet having a thickness of about 180 μm (a target thickness of 180 μm) was produced by the same procedure as in Embodiment 29 except that the aluminum foil had a thickness of 10 μm and the gap spacer thickness, namely the gap D between the rollers, was changed to 10 μm as shown in Table 3.

EMBODIMENT 35

A cathode sheet having a thickness of about 200 μm was produced by the same procedure as in Embodiment 29 except that the aluminum foil had a thickness of 30 μm and the gap spacer thickness, namely the gap D between the rollers, was changed to 30 μm as shown in Table 3.

EMBODIMENT 36

A cathode sheet having a thickness of about 200 μm was produced by the same procedure as in Embodiment 35 except that the gap spacer thickness, namely the gap D between the rollers, was changed to 18 μm as shown in Table 3.

EMBODIMENT 37

An anode mix coating liquid having a solid content concentration of 60% by weight and an apparent viscosity of 3000 mPa·S (a shear rate of 13 $sec^{-1}$) was prepared by mixing 97 parts by weight of fibrous carbonaceous material as the anode active material, 2 parts by weight of a copolymerized compound of styrene and butadiene as the binding agent and 1 part by weight of carboxymethylcellulose as the thickening agent, adding pure water as the solvent, and kneading them.

This slurry-like coating liquid was coated to both surfaces of a copper foil having a thickness of 12 μm one surface at a time with uncoated areas formed at predetermined intervals in the longitudinal direction by the same method employed to apply the above-described cathode mix coating liquid, and dried in hot air. The obtained coated sheet was compressed by being passed between the metal-metal rollers having a diameter of 200 mm in the same way as in Embodiment 25 to produce an anode sheet having a thickness of about 184 μm (a target thickness of 184 μm). At this time, compression was made under conditions of a linear pressure of 300 kg/cm, a speed of 2 m/min, a roller temperature of 25° C., and a gap spacer thickness of 12 μm.

EMBODIMENT 38

An anode sheet was produced by the same procedure as in Embodiment 37 except that the line pressure at pressing was changed to 500 kg/cm as shown in Table 3.

EMBODIMENT 39

An anode sheet was produced by the same procedure as in Embodiment 37 except that the gap spacer thickness, namely the gap D between the rollers, was changed to 7 μm as shown in Table 3.

EMBODIMENT 40

An anode sheet was produced by the same procedure as in Embodiment 39 except that the line pressure at pressing was changed to 500 kg/cm as shown in Table 3.

EMBODIMENT 41

An anode sheet was produced by the same procedure as in Embodiment 38 except that the gap spacer thickness, namely the gap D between the rollers, was changed to 24 μm as shown in Table 3.

EMBODIMENT 42

An anode sheet having a thickness of about 203 μm (a target thickness of 203 μm) was produced by the same procedure as in Embodiment 38 except that the copper foil was changed to have a thickness of 30 μm and the gap spacer thickness, namely the gap D between the rollers, was changed to 30 μm as shown in Table 3.

EMBODIMENT 43

An anode sheet was produced by the same procedure as in Embodiment 42 except that the gap spacer thickness, namely the gap D between the rollers, was changed to 18 μm as shown in Table 3.

COMPARATIVE EMBODIMENT 15

A cathode sheet was produced by the same procedure as in Embodiment 29 except that the gap spacer thickness, namely the gap D between the rollers, was changed to 6 μm as shown in Table 3.

COMPARATIVE EMBODIMENT 16

A cathode sheet was produced by the same procedure as in Embodiment 34 except that the gap spacer thickness, namely the gap D between the rollers, was changed to 5 μm as shown in Table 3.

COMPARATIVE EMBODIMENT 17

A cathode sheet was produced by the same procedure as in Embodiment 35 except that the gap spacer thickness, namely the gap D between the rollers, was changed to 12 μm as shown in Table 3.

COMPARATIVE EMBODIMENT 18

A cathode sheet was produced by the same procedure as in Embodiment 29 except that the gap spacer thickness, namely the gap D between the rollers, was changed to 190 μm as shown in Table 3.

COMPARATIVE EMBODIMENT 19

An anode sheet was produced by the same procedure as in Embodiment 38 except that the gap spacer thickness, namely the gap D between the rollers, was changed to 5 μm as shown in Table 3.

COMPARATIVE EMBODIMENT 20

An anode sheet was produced by the same procedure as in Embodiment 42 except that the gap spacer thickness, namely the gap D between the rollers, was changed to 12 μm as shown in Table 3.

COMPARATIVE EMBODIMENT 21

An anode sheet was produced by the same procedure as in Embodiment 38 except that the gap spacer thickness, namely the gap D between the rollers, was changed to 190 μm as shown in Table 3.

In Embodiments 25 to 43 and Comparative Embodiments 15 to 21, the compressed electrode sheets (the number of pressing times: 1, 2 to 3, and 4 or more) were examined for a thickness and a condition of the base material. The results are shown in Table 3.

TABLE 3

| | Embodiments | | | | | | | | |
|---|---|---|---|---|---|---|---|---|---|
| | 25 | 26 | 27 | 28 | 29 | 30 | 31 | 32 | 33 |
| Base material and thickness (μm) | Al 15 | Al 15 | Al 15 | Al 15 | Al 15 | Al 15 | Al 15 | Al 15 | Al 15 |
| Coated sheet thickness (μm) | 260 | 260 | 260 | 260 | 260 | 260 | 260 | 260 | 260 |
| D (μm) | 15 | 15 | 15 | 15 | 15 | 15 | 12 | 12 | 30 |
| Roller temperature (° C.) | 25 | 25 | 25 | 60 | 60 | 60 | 60 | 60 | 60 |
| Line pressure (kg/cm) | 500 | 750 | 1000 | 300 | 500 | 750 | 300 | 500 | 500 |
| Target thickness (μm) | 185 | 185 | 185 | 185 | 185 | 185 | 185 | 185 | 185 |
| | Thickness after pressing (μm) | | | | | | | | |
| 1st passing | 208 | 206 | 202 | 201 | 198 | 198 | 198 | 194 | 210 |
| 2nd passing | | | | | | | | 185 | 204 |
| 3rd passing | 195 | 194 | 194 | 189 | 185 | 184 | 187 | | |
| 4th passing | | | | | | | 184 | | |
| 5th passing | 185 | 184 | 184 | 185 | | | | | |
| 8th passing | | | | | | | | | |
| 10th or 11th passing | | | | | | | | | |
| State of base material | Normal | Normal | Normal | Normal | Normal | Normal | Normal | Normal | Normal |

| | Embodiments | | | | | | | | | |
|---|---|---|---|---|---|---|---|---|---|---|
| | 34 | 35 | 36 | 37 | 38 | 39 | 40 | 41 | 42 | 43 |
| Base material and thickness (μm) | Al 10 | Al 30 | Al 30 | Cu 12 | Cu 12 | Cu 12 | Cu 12 | Cu 12 | Cu 30 | Cu 30 |
| Coated sheet thickness (μm) | 255 | 286 | 286 | 220 | 220 | 220 | 220 | 220 | 240 | 240 |
| D (μm) | 10 | 30 | 18 | 12 | 12 | 7 | 7 | 24 | 30 | 18 |
| Roller temperature (° C.) | 60 | 60 | 60 | 25 | 25 | 25 | 25 | 25 | 25 | 25 |
| Line pressure (kg/cm) | 500 | 500 | 500 | 300 | 500 | 300 | 500 | 500 | 500 | 500 |
| Target thickness (μm) | 180 | 200 | 200 | 184 | 184 | 184 | 184 | 203 | 203 | |
| | Thickness after pressing (μm) | | | | | | | | | |
| 1st passing | 196 | 214 | 211 | 196 | 191 | 193 | 184 | 207 | 215 | 203 |
| 2nd passing | | | 199 | | | | | | | |
| 3rd passing | 183 | 199 | | 187 | 184 | 187 | | 202 | 203 | |
| 4th passing | 180 | | | | | | | | | |
| 5th passing | | | | 183 | | 183 | | | | |

TABLE 3-continued

|  | | | | | | | | | | |
|---|---|---|---|---|---|---|---|---|---|---|
| 8th passing | | | | | | | | | 184 | |
| 10th or 11th passing | 184 | | | | | | | | | |
| State of base material | Normal | Normal | Normal | Normal | Normal | Normal | Normal | Normal | Normal | Normal |

| | Comparative Embodiments | | | | | | |
|---|---|---|---|---|---|---|---|
| | 15 | 16 | 17 | 18 | 19 | 20 | 21 |
| Base material and thickness (μm) | Al 15 | Al 10 | Al 30 | Al 15 | Cu 12 | Cu 30 | Cu 12 |
| Coated sheet thickness (μm) | 260 | 255 | 286 | 260 | 220 | 240 | 220 |
| D (μm) | 6 | 5 | 12 | 190 | 5 | 12 | 190 |
| Roller temperature (° C.) | 60 | 60 | 60 | 60 | 25 | 25 | 25 |
| Line pressure (kg/cm) | 500 | 500 | 500 | 500 | 500 | 500 | 500 |
| Target thickness (μm) | 185 | 180 | 200 | 185 | 184 | 203 | 184 |
| Thickness after pressing (μm) | | | | | | | |
| 1st passing | 191 | 190 | 210 | 240 | 183 | 200 | 211 |
| 2nd passing | 183 | 180 | 198 | | | | |
| 3rd passing | | | | 237 | | | 209 |
| 4th passing | | | | | | | |
| 5th passing | | | | | | | |
| 8th passing | | | | | | | |
| 10th or 11th passing | | | | 234 | | | 208 |
| State of base material | Cut-off | Cut-off | Stretched | Normal | Cut-off | Stretched | Normal |

It is apparent from Table 3 that Embodiments 25 to 43 could produce a sheet electrode plate having a predetermined thickness without causing a stretch or cut in the base material in the pressing process. On the other hand, Comparative Embodiments 15 to 17, 19 and 20 could not continue the pressing process because the base material was stretched or cutoff when it was pressed one time or two times. And, the base material was not stretched or cut in Comparative Embodiments 18 and 21 but pressing of 10 times or more was insufficient to provide a pressing effect. And, an electrode sheet having a desired thickness could not be obtained.

As apparent from the above description, the invention can compress effectively the coated sheet which is provided with the uncoated areas for connection of the tab plate in the electrode mix applying process by the roller press with a gap formed between the rollers without causing a stretch or cutoff in the conductive base material to produce a sheet electrode plate having an enhanced charging density of the active material. And, an electrode made of the obtained sheet electrode plate can be wound into the shape of a roll through the intermediary of a separator to obtain a nonaqueous electrolyte battery.

Now, the invention will be described with reference to the accompanying drawings.

FIG. 9 is a diagram schematically showing a coating device used for a manufacturing method of the sheet electrode plate according to the invention.

In this supply system, an open-close direction of the three-way valve 36 is switched from a direction to supply to the die nozzle 12 to a direction to the return passage 27 with predetermined timing to supply intermittently the coating liquid to the die nozzle 12, and when the supply is stopped, the coating liquid 16 is returned to the coating liquid tank 31 through the return passage 27. And, when the coating liquid is supplied to the die nozzle 12, it is controlled to change (decrease or increase) continuously the running speed of a servo motor and to decrease or increase continuously the delivery amount (supply amount) of the coating liquid 16 by the liquid feeding pump 35.

Figure 10A:
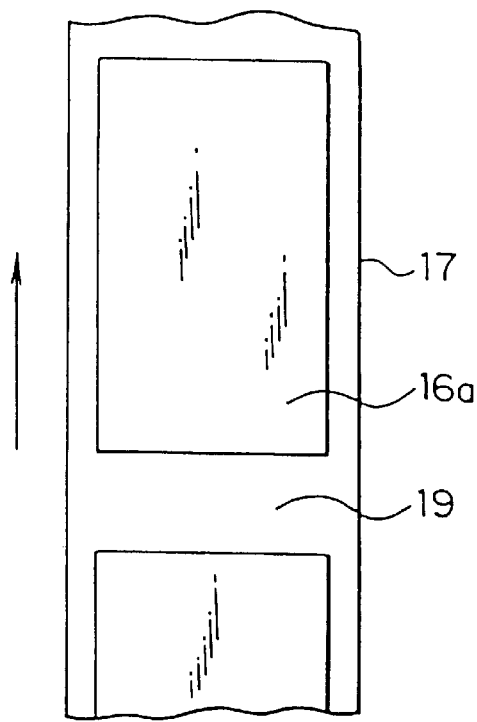
FIG. 10A is a plane view showing a coating pattern of an electrode mix coating liquid coated onto a conductive base material by the coating device used for a manufacturing method of the sheet electrode plate according to the invention.
Figure 10B:
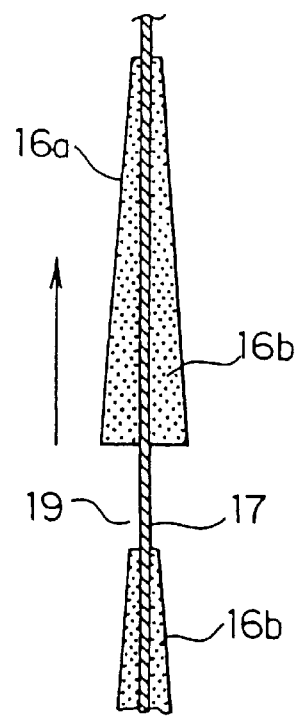
FIG. 10B is a sectional view showing the same pattern.

By the coating device having the above coating liquid supply system, the electrode material coating liquid 16 is coated sequentially or simultaneously to front and back surfaces of the conductive base material 17 to form an uncoated area 19 at predetermined intervals in the longitudinal direction as shown in FIGS. 10A, 10B. And, there is obtained a coated sheet which has on each coated area 16a, 16b a coated amount per unit area, namely thickness of a coated layer 16a, 16b decreased or increased continuously along the longitudinal direction (FIG. 10 shows that the coated layer thickness is continuously decreased at a predetermined ratio along the coated direction indicated by the arrow).

Figure 11:
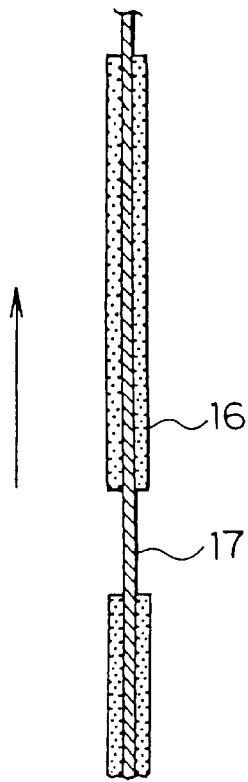
FIG. 11 is a sectional view showing the sheet electrode plate after pressurizing.

Then, the coated sheet is dried in hot air and passed through a pair or multiple pairs of press rollers, thereby compressed under predetermined pressure. Thus, an electrode mix layer 16 which has a uniform thickness along the coated direction with the electrode active material density present in the layer changed (decreased or increased) continuously as shown in FIG. 11.

Now, the invention will be described in further detail referring to specific embodiments.

EMBODIMENT 44

A slurry-like coating liquid having a solid content concentration of 60% by weight was prepared by mixing 90 parts by weight of $LiCoO_2$ as the cathode active material and 5 parts by weight of acetylene black as the conductive agent, adding 5 parts by weight of a fluororubber-based binder as the binding agent, adding ethyl acetate as the solvent, and kneading them. This coating liquid was coated to both surfaces of an aluminum foil having a thickness of 20 $\mu$m one surface at a time with uncoated areas formed at predetermined intervals in the longitudinal direction according to a direct supply method by a liquid feeding pump also using a three-way valve with the coated amount per unit area increased or decreased (increased on the front surface, decreased on the back surface) continuously in a range of 259–286 $g/m^2$ (a difference of coated amount was 10.4% with the minimum value as reference) as shown in Table 4 on both ends in the longitudinal direction of the coated area in a single pattern. Then, after drying in hot air, the obtained coated sheet was compressed by being passed between the press rollers, so that the electrode mix layer on one surface became 85 $\mu$m in thickness to produce a cathode sheet having a thickness of 190 $\mu$m which had the active material density inclined in the longitudinal direction. As shown in Table 4, the active material density in the electrode mix layer was 2.85–3.14 $g/cm^3$ (a difference of the active material density was 10.2% with the minimum value as reference) on both ends in the longitudinal direction of the electrode in one pattern.

A slurry-like coating liquid having a solid content concentration of 60% by weight was prepared by mixing 85 parts by weight of mesophase pitch carbon fiber as the anode active material, 5 parts by weight of acetylene black as the conductive agent and 5 parts by weight of graphite, adding 5 parts by weight of styrene butadiene rubber as the binding agent, adding water as the solvent, and kneading them. This coating liquid was coated to both surfaces of a copper foil having a thickness of 20 $\mu$m one surface at a time with uncoated areas formed at predetermined intervals in the longitudinal direction according to a gas force feeding system which fed pressurized air into the enclosed tank to pressurize. And, by continuously varying the pressure of air fed into the enclosed tank, the coating liquid was applied to the copper foil with one surface at a time while increasing or decreasing continuously the coated amount per unit area on both ends in the longitudinal direction of the coated area of one pattern in a range of 110–122 $g/m^2$ (a difference of 10.9%) as indicated in Table 4. Then, after drying in hot air, the obtained coated sheet was compressed by being passed between the press rollers, so that the electrode mix layer on one surface became 85 $\mu$m in thickness to produce an anode sheet having a thickness of 190 $\mu$m which had the active material density of 1.29–1.43 $g/cm^3$ (a difference of 10.9%) inclined in the longitudinal direction as shown in Table 4.

Then, the produced cathode and anode sheets were cut to each length (the cathode had an electrode length of 880 mm, and the anode had an electrode length of 900 mm) as shown in Table 4 and wound into the shape of a roll through the intermediary of a micro-cellular polypropylene film as the separator to have the end section with a smaller active material density inside the wound coil to produce a cylindrical battery.

EMBODIMENT 45

Cathode and anode were produced using the same electrode mix and the same means as in Embodiment 44. Specifically, as shown in Table 4, the coating liquid was coated intermittently to both surfaces one surface at a time with the coated amount continuously varied (increased) in a range of 249–298 $g/m^2$ (a difference of 19.7%) in one pattern to obtain a coated sheet. The obtained coated sheet was dried in hot air and compressed by the press rollers so that the electrode mix layer on one surface had a thickness of 85 $\mu$m, so as to produce a cathode sheet having a thickness of 190 $\mu$m with an active material density of 2.73–3.27 $g/m^3$ (a difference of 19.8%) inclined in the longitudinal direction.

As to the anode, the coating liquid was intermittently coated to both surfaces one surface at a time while continuously increasing the coating amount in a range of 107–128 $g/m^2$ (a difference of 19.6%) in one pattern as shown in Table 4, and the obtained coated sheet was dried in hot air and compressed by the press rollers to have the electrode mix layer having a thickness of 85 $\mu$m on one surface, thereby producing an anode sheet having a thickness of 190 $\mu$m with an active material density of 1.26–1.50 $g/m^3$ (a difference of 19.0%) inclined in the longitudinal direction.

The cathode and anode sheets thus produced were cut to the lengths specified in Table 4 and wound into the shape of a roll through the intermediary of a micro-cellular polypropylene film as the separator to have the end section with a smaller active material density inside the wound coil to produce a cylindrical battery.

EMBODIMENT 46

Cathode and anode were produced using the same electrode mix and the same means as in Embodiment 44. Specifically, as shown in Table 4, the coating liquid was coated intermittently to both surfaces one surface at a time with the coating amount continuously increased in a range of 242–302 $g/m^2$ (a difference of 24.8%) in one pattern to obtain a coated sheet. The obtained coated sheet was dried in hot air and compressed by the press rollers so that the electrode mix layer on one surface had a thickness of 85 $\mu$m, thereby producing a cathode sheet having a thickness of 190 $\mu$m with an active material density of 2.66–3.32 $g/m^3$ (a difference of 24.8%) inclined in the longitudinal direction.

As to the anode, the coating liquid was intermittently coated to both surfaces one surface at a time while continuously increasing the coating amount in a range of 105–130 $g/m^2$ (a difference of 23.8%) in one pattern as shown in Table 4, and the obtained coated sheet was dried in hot air and compressed by the press rollers to have the electrode mix layer having a thickness of 85 μm on one surface, thereby producing an anode sheet having a thickness of 190 μm with an active material density of 1.23–1.53 g/m³ (a difference of 24.4%) inclined in the longitudinal direction.

The cathode and anode sheets thus produced were cut to the lengths specified in Table 4 and wound into the shape of a roll through the intermediary of a micro-cellular polypropylene film as the separator to have the end section with a smaller active material density inside the wound coil to produce a cylindrical battery.

EMBODIMENT 47

The coated sheet for the cathode produced in Embodiment 46 was compressed by the press rollers to have the electrode mix layer having a thickness of 88 μm on one surface (a compressibility was slightly lowered so that the active material density on the high density side did not become excessively high) to produce a cathode sheet having a thickness of 196 μm with the active material density inclined as shown in Table 4 in the longitudinal direction. The coated sheet for the anode produced in Embodiment 46 was compressed in the same way to have the electrode mix layer having a thickness of 88 μm on one surface to produce an anode sheet having a thickness of 196 μm with the active material density inclined as shown in Table 4 in the longitudinal direction. Thus, the cathode and anode sheets having substantially the same maximum value of active material density as in Embodiment 45 were produced.

The cathode and anode sheets thus produced were cut to 850 mm and 870 mm respectively and wound into the shape of a roll through the intermediary of a micro-cellular polypropylene film as the separator to have the end section with a smaller active material density inside the wound coil to produce a cylindrical battery. The cathode and the anode were determined to have a length of 850 mm and 870 mm Af respectively which were shorter than those of the cathodes and the anodes in Embodiments 44 to 46, because the cathode and the anode in Embodiment 47 had a thickness (196 μm) which was larger than that (190 μm) of these in Embodiments 44 to 46 and the electrode rolled and housed in one battery became short.

COMPARATIVE EMBODIMENT 22

For the cathode and anode, the coating liquid was coated in a predetermined amount by using the same electrode mix and the same means as in Embodiment 44 without varying the coating amount in one pattern. The obtained coated sheet was dried in hot air and compressed by the press rollers to produce cathode and anode sheets having a predetermined (uniform) active material density (a difference of active material density was 0%) in the longitudinal direction. Then, the cathode and Anode sheets thus produced were cut to the lengths specified in Table 4 and wound into the shape of a roll through the intermediary of a micro-cellular polypropylene film as the separator to produce a cylindrical battery.

COMPARATIVE EMBODIMENT 23

The cathode and anode sheets produced in Embodiment 44 were each cut to the same length as in Embodiment 44, and wound into the shape of a roll with a micro-cellular polypropylene film as the separator involved to have the end section with a larger active material density inside the wound coil to produce a cylindrical battery.

TABLE 4

|  |  | Embodiments |  |  |  |  |  |  |  | Comparative Embodiments |  |
|---|---|---|---|---|---|---|---|---|---|---|---|
|  |  | 44 | | 45 | | 46 | | 47 | | 22 | |
|  |  | Cathode | Anode | Cathode | Anode | Cathode | Anode | Cathode | Anode | Cathode | Anode |
| Coating amount in one pattern (g/m²) | Min. | 259 | 110 | 249 | 107 | 242 | 105 | 242 | 105 | 272 | 116 |
|  | Max. | 286 | 122 | 298 | 128 | 302 | 130 | 302 | 130 | 272 | 116 |
| Difference of coating amount in one pattern (%) |  | 10.4 | 10.9 | 19.7 | 19.6 | 24.8 | 23.8 | 24.8 | 23.8 | 0.0 | 0.0 |
| Active material density in one pattern (g/m³) | Min. | 2.85 | 1.29 | 2.73 | 1.26 | 2.66 | 1.23 | 2.58 | 1.19 | 3.00 | 1.36 |
|  | Max. | 3.14 | 1.43 | 3.27 | 1.50 | 3.32 | 1.53 | 3.20 | 1.47 | 3.00 | 1.36 |
| Difference of active material density in one pattern (%) |  | 10.2 | 10.9 | 19.8 | 19.0 | 24.8 | 24.4 | 24.0 | 23.5 | 0.0 | 0.0 |
| Thickness of electrode mix layer on one surface (μm) |  | 85 | 85 | 85 | 85 | 85 | 85 | 88 | 88 | 85 | 85 |
| Length of electrode housed in battery (mm) |  | 880 | 900 | 880 | 900 | 880 | 900 | 850 | 870 | 880 | 900 |

The cylindrical batteries produced in Embodiments 44 to 47 and Comparative Embodiments 22 and 23 were tested for an overcharge (3C-15V) and a discharge capacity and deviations. And, they were also tested for a charging and discharging cycle to measure the number of charging and discharging times (cycle life) until the capacity becomes 80% of the initial value. The results of the overcharge test were indicated by o for excellent, o for good, and x for bad.

And, the discharge capacity was indicated with the battery capacity obtained in Comparative Embodiment 22 as reference. These test results are shown in Table 5.

TABLE 5

|  | Embodiments | | | | Comparative Embodiments | |
|---|---|---|---|---|---|---|
|  | 44 | 45 | 46 | 47 | 22 | 23 |
| Overcharge test | ⊚ | ⊚ | ○ | ⊚ | ○ | x |
| Comparison of capacity (%) | +12 | +7 | −6 | −11 | ±0 | −8 |
| Deviation of capacity (%) | ±1 | ±3 | ±7 | ±4 | ±5 | ±13 |
| Cycle life (Frequency) | 1200 | 950 | 500 | 1100 | 800 | 10 |

It is apparent from Table 5 that safety of the battery against overcharge was improved and its capacity was increased, and deviations in the capacity were decreased in Embodiments 44 to 47 wherein the sheet electrode having the coating amount per unit area at each electrode coating section continuously varied and the active material density in the electrode mix layer after compressing treatment also varied slantingly. And, the inclination of the coating amount and active material density at the electrode coating section in one pattern is preferably configured to decrease from the outside to the inside of a spiral structure. But, in Embodiment 46 wherein a difference between the minimum and maximum values of the coating amount and the active material density exceeds 20% of the minimum value, the electrolytic solution is poor to permeate at the outer periphery of the spiral structure having a high active material density, resulting in decreasing the capacity, increasing variations in capacity, and shortening the cycle life. Besides, when compressibility in the pressurizing treatment was lowered to prevent the active material density on the high density side from becoming excessively high so that the electrolytic solution permeates fully at the outer periphery of the spiral structure as in Embodiment 47, the electrode was made thick and the electrode to be housed in the battery become short. As a result, it is seen that the capacity is decreased substantially because the active material amount is decreased.

It is apparent from the above description that the sheet electrode plate can be produced with the uncoated areas formed at predetermined intervals in the longitudinal direction and the active material density in the electrode mix layer varied continuously in each electrode coated section between the uncoated areas by the method of the present invention. And, the electrode produced from the sheet electrode plate is wound into a roll through the intermediary of the separator and used as the cathode and/or anode, so that there can be obtained a nonaqueous electrolyte battery having excellent safety, high capacity, a less deviation of the discharge capacity, and an improved charging and discharging cycle.

The invention will be described with reference to the accompanying drawings.

Figure 12:
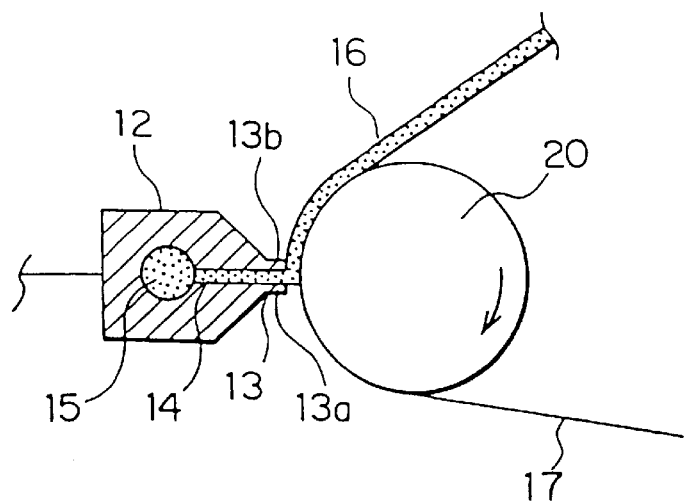
FIG. 12 is a diagram schematically showing one embodiment of a coating device used for a manufacturing method of the sheet pole plate according to the invention.
Figure 13:
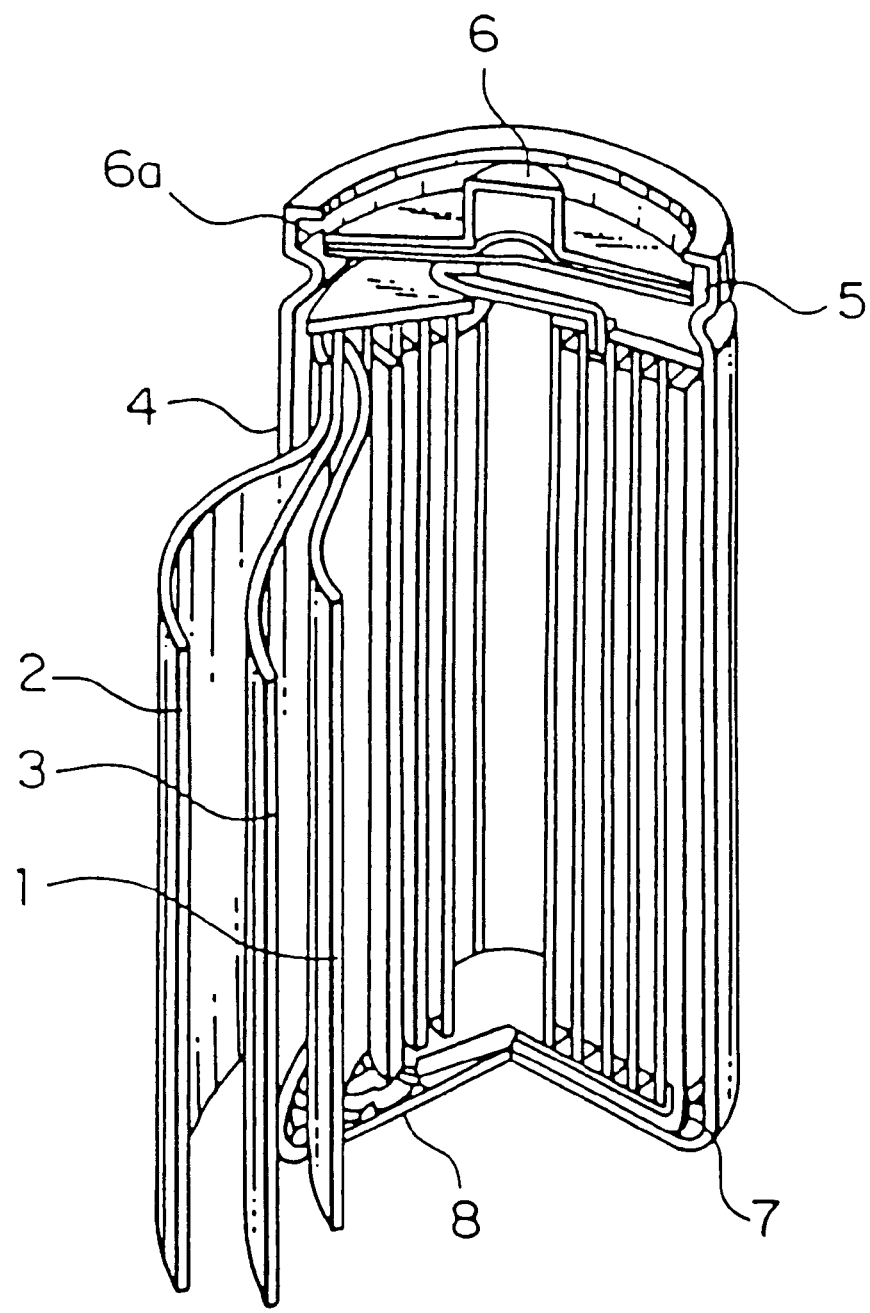
FIG. 13 is a sectional view showing one embodiment of the structure of a cylindrical nonaqueous electrolyte battery.

FIG. 12 is a diagram schematically showing a coating device used for a manufacturing method of the sheet electrode plate according to the invention.

In this coating device, a die nozzle 12 is disposed such that a conductive base material 17 is moved continuously in close contact with the roll surface of a revolving backup roll 20, and the tips of lips 13 are kept a predetermined space away from the conductive base material 17. The die nozzle 12 has two lips 13 (an inlet lip 13a, an outlet lip 13b) which are mutually opposed with an appropriate gap therebetween, and a land 14 is formed of these lips 13. And, the die nozzle 12 has a manifold 15 which is communicated with the land 14 and keeps the coating liquid in it. An electrode mix coating liquid 16 is supplied to the manifold 15 by a coating liquid supply system (not shown) which is disposed outside of the die nozzle 12, and injected from the outlet formed at the tips of the lips 13 through the land 14 to be coated onto the conductive base material 17.

By the coating device, the electrode mix coating liquid 16 is coated with the coating amount per unit area, namely the coated thickness, varied on front and back surfaces of the conductive base material 17. And, the coated sheet is dried in hot air and passed through a pair of multiple pairs of press rollers, thereby compressed under predetermined pressure. Thus, the electrode mix layers on the front and back surfaces have a different thickness in proportion to the coated amount of the electrode mix coating liquid 16, and therefore, the electrodes formed have a different active material density in the layers.

Now, the invention will be described in further detail referring to specific embodiments.

EMBODIMENT 48

A slurry-like coating liquid having a solid content concentration of 60% by weight was prepared by mixing 90 parts by weight of $LiCoO_2$ as the cathode active material and 5 parts by weight of acetylene black as the conductive agent, adding 5 parts by weight of a fluororubber-based binder as the binding agent, adding ethyl acetate as the solvent, and kneading them. This coating liquid was coated to both surfaces of an aluminum foil having a thickness of 20 $\mu$m one surface at a time by the coating device shown in FIG. 14 and with the same coating amount (per unit area) on the front and back surfaces as shown in Table 6. Then, the obtained coated sheet was dried in hot air and compressed by the press rollers to produce a cathode sheet having a thickness of 200 $\mu$m.

A slurry-like coating liquid having a solid content concentration of 60% by weight was prepared by mixing 85 parts by weight of mesophase pitch carbon fiber as the anode active material, 5 parts by weight of acetylene black as the conductive agent and 5 parts by weight of graphite, adding 5 parts by weight of styrene butadiene rubber as the binding agent, adding water as the solvent, and kneading them. This coating liquid was coated to both surfaces of a copper foil having a thickness of 20 $\mu$m one surface at a time by the same method as for the cathode mix coating liquid with the coating amounts on the front and back surfaces changed by 4.9% (with respect to the coated amount onto the front surface) as shown in Table 6. The obtained coated sheet was dried in hot air and compressed by the press rollers to produce an anode sheet having a thickness of 200 $\mu$m.

Then, the cathode and anode sheets were cut to a predetermined size, and wound into a roll through the intermediary of a micro-cellular polypropylene film as the separator with the front surfaces of the respective foils inside and the back surfaces outside to produce a cylindrical battery.

EMBODIMENT 49

Cathode and anode electrode sheets were respectively produced using the same electrode mix coating liquid by the same means as in Embodiment 48 with the coating amount for the cathode changed by 4.9% between the front and back surfaces as shown in Table 6. Then, these electrode sheets were wound into a roll in the same way as in Embodiment 48 through the intermediary of a micro-cellular polypropylene film as the separator to produce a cylindrical battery.

EMBODIMENT 50

Cathode and anode sheets were respectively produced using the same electrode mix coating liquid by the same means as in Embodiment 48 with the coating amount for the cathode changed by 2.6% and for the anode changed by 2.5% between the front and back surfaces as shown in Table 6. Then, these electrode sheets were wound into a roll in the same way as in Embodiment 48 through the intermediary of a micro-cellular polypropylene film as the separator to produce a cylindrical battery.

EMBODIMENT 51

Cathode and anode sheets were respectively produced using the same electrode mix coating liquid by the same means as in Embodiment 48 with the coating amount for the cathode changed by 7.1% and for the anode changed by 7.2% between the front and back surfaces as shown in Table 6. Then, these electrode sheets were wound into a roll in the same way as in Embodiment 48 through the intermediary of a micro-cellular polypropylene film as the separator to produce a cylindrical battery.

COMPARATIVE EMBODIMENT 24

Cathode and anode sheets were respectively produced using the same electrode mix coating liquid by the same means as in Embodiment 48 with the coating amount same for the cathode and the anode between the front and back surfaces as shown in Table 6. Then, these electrode sheets were wound into a roll in the same way as in Embodiment 48 through the intermediary of a micro-cellular polypropylene film as the separator to produce a cylindrical battery.

COMPARATIVE EMBODIMENT 25

Cathode and anode sheets were respectively produced using the same electrode mix coating liquid by the same means as in Embodiment 48 with the coating amount for the anode changed by 14.0% between the front and back surfaces as shown in Table 6. Then, these electrode sheets were wound into a roll in the same way as in Embodiment 48 through the intermediary of a micro-cellular polypropylene film as the separator to produce a cylindrical battery.

COMPARATIVE EMBODIMENT 26

Cathode and anode sheets were respectively produced using the same electrode mix coating liquid by the same means as in Embodiment 48 with the coating amount for the cathode changed by 14.2% between the front and back surfaces as shown in Table 6. Then, these electrode sheets were wound into a roll in the same way as in Embodiment 48 through the intermediary of a micro-cellular polypropylene film as the separator to produce a cylindrical battery.

Table 7 shows the ratio of electrode mix coating amount between the cathode and the anode which are mutually opposed with the separator therebetween in the batteries produced in Embodiments 48 to 51 and Comparative Embodiments 24 to 26. The optimum value of the ratio of coating amounts in the flat plate state is 2.50 (cathode/anode) corresponding to the ratio in Comparative Embodiment 24.

TABLE 6

| | Embodiments | | | | Comparative Embodiments | | |
|---|---|---|---|---|---|---|---|
| | 48 | 49 | 50 | 51 | 25 | 26 | 27 |
| Cathode | | | | | | | |
| Coated amount on front surface (g/m$^2$) | 300 | 293 | 296 | 289 | 300 | 300 | 277 |
| Coated amount on back surface (g/m$^2$) | 300 | 308 | 304 | 311 | 300 | 300 | 323 |
| Difference of coated amount between front and back surfaces (%) | 0.0 | 4.9 | 2.6 | 7.1 | 0.0 | 0.0 | 14.2 |
| Anode | | | | | | | |
| Coated amount on front surface (g/m$^2$) | 117 | 120 | 119 | 116 | 120 | 111 | 120 |
| Coated amount on back surface (g/m$^2$) | 123 | 120 | 122 | 125 | 120 | 129 | 120 |
| Difference of coated amount between front and back surfaces (%) | 4.9 | 0.0 | 2.5 | 7.2 | 0.0 | 14.0 | 0.0 |

TABLE 7

| | Embodiments | | | | Comparative Embodiments | | |
|---|---|---|---|---|---|---|---|
| | 48 | 49 | 50 | 51 | 25 | 26 | 27 |
| Opposed electrodes | | | | | | | |
| Coated amount for cathode's inside (front surface) (g/m$^2$) | 300 | 293 | 296 | 289 | 300 | 300 | 277 |
| Coated amount for anode's outside (back surface) (g/m$^2$) | 123 | 120 | 122 | 125 | 120 | 129 | 120 |
| Ratio of coated amounts (cathode/anode) | 2.44 | 2.44 | 2.43 | 2.31 | 2.50 | 2.33 | 2.31 |
| Opposed electrodes | | | | | | | |
| Coated amount for cathode's outside (back surface) (g/m$^2$) | 300 | 308 | 304 | 311 | 300 | 300 | 323 |
| Coated amount for anode's inside (front surface) (g/m$^2$) | 177 | 120 | 119 | 116 | 120 | 111 | 120 |
| Ratio of coated amounts (cathode/anode) | 2.56 | 2.57 | 2.55 | 2.68 | 2.50 | 2.70 | 2.69 |

The batteries produced in Embodiments and Comparative Embodiments were tested for an overcharge (3C-15V) and a discharge capacity. And, they were also tested for a charging and discharging cycle to measure the number of charging and discharging times (cycle life) until the capacity becomes 80% of the initial value. The results of the overcharge test were indicated by ⊙ for excellent, o for good, Δ for fair and x for bad. And, the discharge capacity was indicated with the battery capacity obtained in Comparative Embodiment 24 as reference. These test results are shown in Table 8.

TABLE 8

|  | Embodiments | | | | Comparative Embodiments | | |
| --- | --- | --- | --- | --- | --- | --- | --- |
|  | 48 | 49 | 50 | 51 | 25 | 26 | 27 |
| Overcharge test | ⊙ | ○ | ⊙ | ○ | Δ | X | X |
| Comparison of capacity (%) | +5 | +3 | +6 | +2 | ±0 | −3 | −4 |
| Cycle life (Frequency) | 1400 | 1250 | 1500 | 1050 | 1000 | 800 | 750 |

It is apparent from Table 8 that in Embodiments 48 to 51 wherein the sheet electrodes having the coated amount of the electrode mix per unit area varied in a range of 2 to 10% between the front and rear surfaces were used for one or both of the cathode and the anode, the ratio of the coated amount of electrode mix between the cathode and the anode mutually opposed with the separator therebetween is well balanced at each section (the core and the outer periphery), safety against overcharge is improved and the discharge capacity is increased as compared with Comparative Embodiment 24 wherein the electrode plate having the same coated amount on both surfaces is used. And, the charging and discharging cycling property was improved, and the cycle life was increased substantially.

On the other hand, in Comparative Embodiments 25 and 26 wherein the electrode plates having a difference in coated amount exceeding 10% between the front and back surfaces were used as the cathode or the anode, a ratio of coated amounts between the cathode and the anode mutually opposed with the separator therebetween is substantially different at each section, permeability of the electrolytic solution by charging or discharging is partly inferior, safety and capacity against overcharge are lowered, and cycle life is shortened.

It is apparent from the above description that the sheet electrode plate with the coated amount of electrode mix per unit area, namely the electrode active material density, varied between the front and back surfaces can be obtained by the present invention; the electrodes which are produced from the sheet electrode plate are wound into a roll with the separator therebetween and used as the cathode and/or anode, so that there can be obtained a nonaqueous electrolyte battery having excellent safety, high capacity, and an improved charging and discharging cycle property.

What is claimed is:

1. An apparatus for manufacturing an electrode plate of a nonaqueous electrolyte battery to apply an electrode material composition onto at least one of a first surface and a second surface of a rectangular sheet conductive base material having a first side and a second side shorter than the first side, comprising:
   means for moving the sheet conductive base material in a direction of the first side;
   a die nozzle disposed in the neighborhood of the surface of the moving sheet conductive base material, for injecting the electrode material composition in a direction substantially perpendicular to the first side;
   an electrode material composition tank for containing the electrode material composition;
   supplying pipes connecting the die nozzle and the electrode material composition tank;
   a pump disposed at the supplying pipes;
   a valve disposed at the supplying pipes between the pump and the die nozzle;
   a suction system disposed at the supplying pipes between the valve and the die nozzle; and
   means for drying the electrode material composition, wherein the die nozzle is configured to move in a direction substantially perpendicular to and to separate from the first surface of the sheet conductive base material to form uncoated areas.

2. An apparatus for manufacturing an electrode plate of a nonaqueous electrolyte battery to apply an electrode material composition onto at least one of a first surface and a second surface of a rectangular sheet conductive base material having a first side and a second side shorter than the first side, comprising:
   means for moving the sheet conductive base material in a direction of the first side;
   a die nozzle disposed in the neighborhood of the surface of the moving sheet conductive base material, for injecting the electrode material composition in a direction substantially perpendicular to the first side;
   an electrode material composition tank for containing the electrode material composition;
   supplying pipes connecting the die nozzle and the electrode material composition tank;
   a pump disposed at the supplying pipes;
   a valve disposed at the supplying pipes between the pump and the die nozzle;
   a suction system disposed at the supplying pipes between the valve and the die nozzle; and
   means for drying the electrode material composition, wherein the sheet conductive base material is configured to move in a direction substantially perpendicular to and to separate from the tip of the die nozzle to form uncoated areas.

3. An apparatus for manufacturing an electrode plate of a nonaqueous electrolyte battery to apply an electrode material composition onto at least one of a first surface and a second surface of a rectangular sheet conductive base material having a first side and a second side shorter than the first side, comprising:
   means for moving the sheet conductive base material in a direction of the first side;
   a die nozzle disposed in the neighborhood of the surface of the moving sheet conductive base material, for injecting the electrode material composition in a direction substantially perpendicular to the first side;
   an electrode material composition tank for containing the electrode material composition;
   supplying pipes connecting the die nozzle and the electrode material composition tank;
   a pump disposed at the supplying pipes;
   a valve disposed at the supplying pipes between the pump and the die nozzle;
   a suction system disposed at the supplying pipes between the valve and the die nozzle; and
   means for drying the electrode material composition, wherein the die nozzle is configured to move along the first direction to form uncoated areas.

4. An apparatus for manufacturing an electrode plate of a nonaqueous electrolyte battery to apply an electrode material composition onto at least one of a first surface and a second surface of a rectangular sheet conductive base material having a first side and a second side shorter than the first side, comprising:

means for moving the sheet conductive base material in a direction of the first side;

a die nozzle disposed in the neighborhood of the surface of the moving sheet conductive base material, for injecting the electrode material composition in a direction substantially perpendicular to the first side;

an electrode material composition tank for containing the electrode material composition;

supplying pipes connecting the die nozzle and the electrode material composition tank;

a pump disposed at the supplying pipes;

a valve disposed at the supplying pipes between the pump and the die nozzle;

a suction system disposed at the supplying pipes between the valve and the die nozzle; and means for drying the electrode material composition, wherein a coated amount the electrode material composition per unit area along the first running direction of the sheet conductive base material is continuously increased or decreased.

* * * * *

UNITED STATES PATENT AND TRADEMARK OFFICE
CERTIFICATE OF CORRECTION

PATENT NO. : 6,314,638 B1  
DATED : November 13, 2001  
INVENTOR(S) : Hideki Kaido et al.

Page 1 of 1

It is certified that error appears in the above-identified patent and that said Letters Patent is hereby corrected as shown below:

<u>Column 46, claim 4,</u>  
Line 7, "amount the" should read -- amount of the --.

Signed and Sealed this

Nineteenth Day of March, 2002

Attest:

JAMES E. ROGAN  
*Director of the United States Patent and Trademark Office*

*Attesting Officer*